United States Patent
Parker et al.

(10) Patent No.: US 7,015,953 B2
(45) Date of Patent: *Mar. 21, 2006

(54) MULTI-USER CAMERA CONTROL SYSTEM AND METHOD

(75) Inventors: Jeffrey L. Parker, Jacksonville, FL (US); David F. Sorrells, Jacksonville, FL (US)

(73) Assignee: Thomson Licensing, Boulogne-Billancourt (FR)

(*) Notice: Subject to any disclaimer, the term of this patent is extended or adjusted under 35 U.S.C. 154(b) by 0 days.

This patent is subject to a terminal disclaimer.

(21) Appl. No.: 09/003,325

(22) Filed: Jan. 6, 1998

(65) Prior Publication Data

US 2003/0169329 A1 Sep. 11, 2003

Related U.S. Application Data

(62) Division of application No. 08/586,426, filed on Jan. 6, 1996, now Pat. No. 6,108,035, which is a continuation of application No. 08/255,257, filed on Jun. 7, 1994, now abandoned.

(51) Int. Cl.
*H04N 5/232* (2006.01)

(52) U.S. Cl. .................. 348/211.04; 348/14.05
(58) Field of Classification Search ............ 348/207.11, 348/207.1, 14.01, 14.11, 14.12, 14.05, 211.99, 348/211.2, 211.3, 211.4, 211.11, 13, 14, 15, 348/16, 17, 14.08
See application file for complete search history.

(56) References Cited

U.S. PATENT DOCUMENTS

| | | | | |
|---|---|---|---|---|
| 4,516,156 A | * | 5/1985 | Fabris et al. | 348/15 |
| 4,945,367 A | * | 7/1990 | Blackshear | 396/427 |
| 5,206,721 A | * | 4/1993 | Ashida et al. | 348/15 |
| 5,268,734 A | * | 12/1993 | Parker et al. | 356/152 |
| 5,471,296 A | * | 11/1995 | Parker et al. | 348/213 |
| 5,818,513 A | * | 10/1998 | Sano et al. | 348/15 |
| 5,877,801 A | * | 3/1999 | Martin et al. | 348/15 |
| 6,677,990 B1 | * | 1/2004 | Kawahara | 348/211.13 |

* cited by examiner

*Primary Examiner*—Wendy R. Garber
*Assistant Examiner*—Jacqueline Wilson
(74) *Attorney, Agent, or Firm*—Joseph S. Tripoli; Harvey D. Fried; Robert B. Levy

(57) ABSTRACT

A multi-user camera control system with automatic tracking capability for use in video conferencing and similar applications includes a plurality of personal controllers, one for each person utilizing the system. Each personal controller includes a micro-computer controlled keypad and associated communication circuitry as well as optional audio and tracking capability. The controller is programmed with the capability to send commands to the camera system.

The system employs programmed, automatically trackable controllers for issuing commands to control most of the functions of a camera including lens operation. Personal locator devices are electrically connected and can be programmed as a master and as slaves. In addition, a master having override features may be provided, as well as a director's locator device for system wide control.

40 Claims, 24 Drawing Sheets

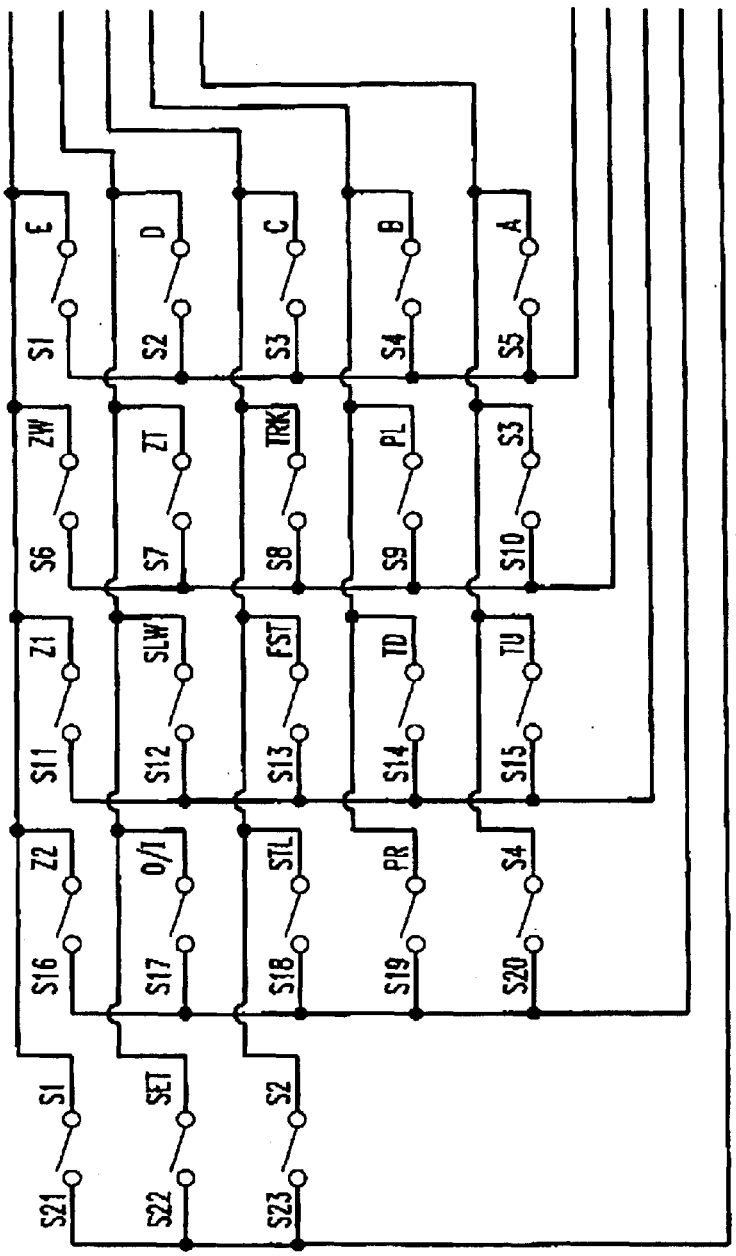

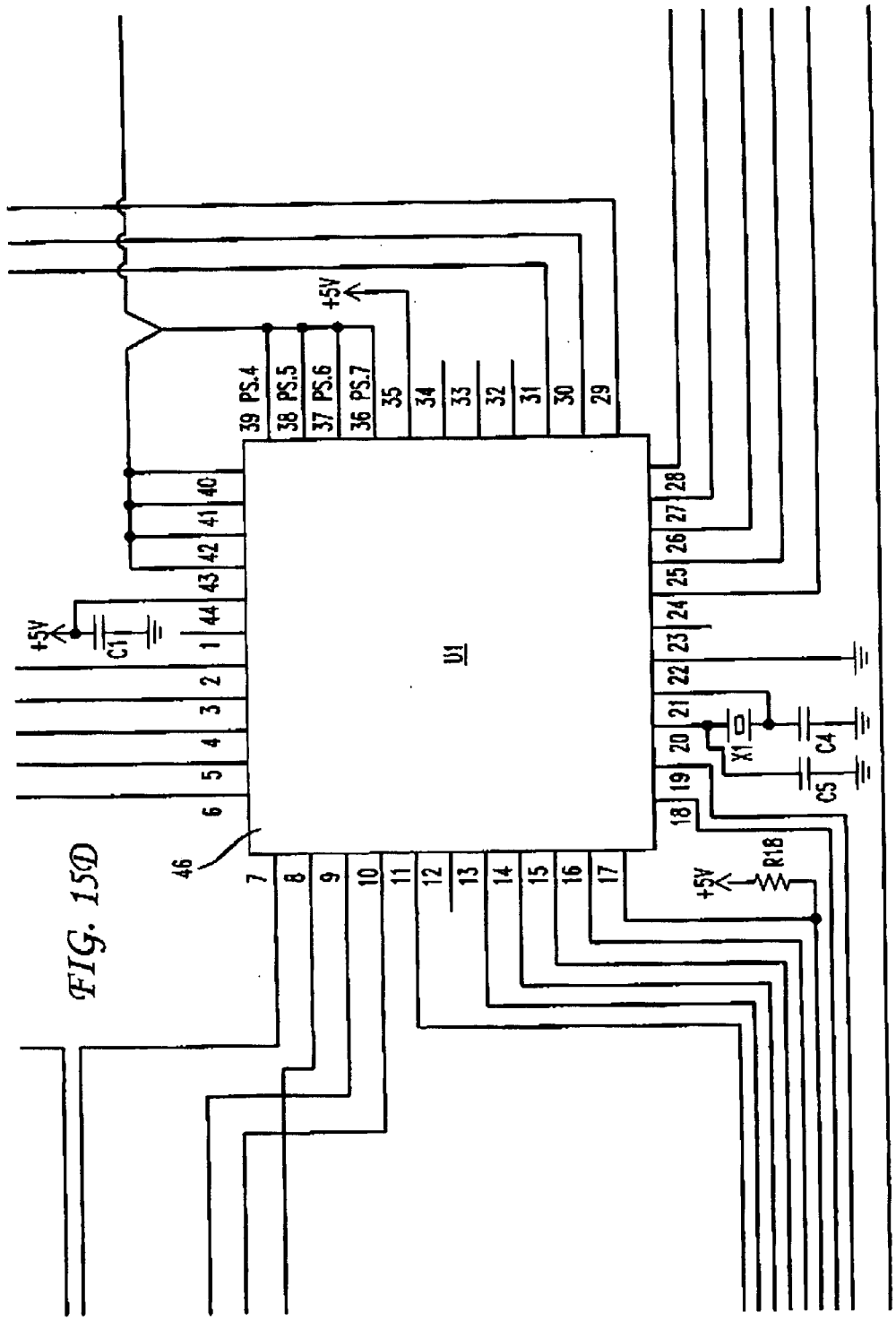

| FIG. 16A | FIG. 16B |
|---|---|
| FIG. 16C | FIG. 16D |

MULTI-USER CAMERA CONTROL SYSTEM AND METHOD

This is a division of application Ser. No. 08/586,426 filed on Jan. 6, 1996 now U.S. Pat. No. 6,108,035 which is a continuation of application Ser. No. 08/255,257 filed on Jun. 7, 1994 now abandoned.

BACKGROUND OF THE INVENTION

1. Field of the Invention

The present invention relates to multi-user camera system control particularly for use in video teleconferencing systems, distance learning, audience response, and particularly to user controls for video cameras and associated apparatus in these systems, as well as systems employing automatic tracking capabilities.

2. Prior Art

Current multi-user camera systems in applications such as video conferencing, distance learning, etc. employing cameras have a single point of centralized control with some limited pan, tilt, zoom, and location presents. Having a centralized control generally requires a facilitator to act as a camera operator. This facilitator must decide who or what will be displayed, select a camera, pan, tilt, and zoom the camera and will require repetition of this process each time someone new takes the floor. An alternative method is to use a wide angle shot of the entire group of people. The primary drawback of this alternative approach is that no one can be seen clearly in such a wide field of view. The facilitator has one more level of control that attempts to solve the multi-user problems; the location presets. By using presets, the facilitator can press a button to position a camera to predetermined pan, tilt, and zoom settings, and must still decide when, who and what to display. These location presets still require the presence of the facilitator who must still attempt to follow the conversation(s) via the use of location presets for the participants in the group.

What is needed is a system that solves these problems by providing a distributed control architecture to the participants, in place of or to compliment a centralized controller for the facilitator. Each person involved would have a single person user interface which allows control of the desired view of each person or anything else to be displayed. When a person wants to speak, a command can be sent and a camera is directed to such person, allowing a face to face conversation or allowing the display of of a predetermined view. Now each person can be seen clearly and at the proper time. This eliminates the facilitator's guess work of who or what to display. One-on-one conversations now become the rule rather than the exception. When appropriate, the entire group can be displayed by issuing the appropriate command from any of the individual controllers.

The desired system should include automatic tracking capability so that when the appropriate command or commands are sent, the system will automatically locate the user controller, automatically select a camera, and automatically select the desired field of view of the camera based on the user's location in the system area. Also, pan, tilt, zoom and iris of the camera may be made and remembered automatically without the assistance of the facilitator.

SUMMARY OF THE INVENTION

In one aspect of the present invention there is provided a method of controlling the field of view variables of a camera in a system including a camera, a means for adjusting the field of view variables of the camera and at least two remote control devices capable of sending commands to the means for adjusting the field of view variables of the camera comprising the steps of: remembering at least two specific fields of view of the camera; issuing a field of view command from at least one remote control device; and moving the field of view of the camera to one of the fields of view so remembered. In other aspects of the invention, commands are issued from each of the remote control devices to remember different fields of view of the camera; and remembering the remote control device that issued the respective command. Other steps include moving the field of view of the camera to the field of view remembered associated with the remembered remote control device that issued the respective command; remembering the position of the camera with respect to a known reference; remembering the position in a first plane; and remembering the position of the camera in another plane.

The present invention also provides the steps of: remembering the zoom perspective of the camera; remembering the focus position of the camera; remembering the iris position of the camera; moving the position of the camera to the remembered position; changing the zoom perspective of the camera to the remembered position; moving the focus position of the camera to the remembered position; and issuing a command by one of the remote control devices to override commands from other remote control devices affecting the field of view of the camera.

A further aspect of the present invention provides a method of controlling the field of view controls of each camera in a system including at least two cameras, a means for controlling the variables that define the field of view of each camera and at least two remote control devices capable of sending commands to each means for controlling the field of view variables of the respective camera comprising the steps of remembering at least one field of view of each camera; issuing a field of view variable command from at least one of the remote control devices to the means of controlling the cameras; and changing the field of view variables of the camera associated with the field of view remembered to provide the field of view remembered. Other steps include issuing commands from each of the remote control devices to remember a different field of view of the camera; remembering the remote control device that issued the respective command; changing the field of view of the respective camera to the field of view remembered associated with remembered remote control device that issued the respective command; remembering the position of each camera with respect to a known reference; remembering the position of each camera in two planes; remembering the zoom perspective of each camera; remembering the iris position of each camera; changing the position of the camera associated with the remembered field of view to the remembered position; changing the zoom perspective of the camera associated with the remembered field of view to the remembered perspective; and changing the iris position of the camera associated with the remembered field of view to the remembered position. Also, a command may be issued by one of the remote control devices to override commands from other remote control devices affecting the field of view of any camera, and the method may include automatic tracking.

In another aspect of the invention, there is provided a system for controlling the field of view control variables of a camera comprising a camera, control means for adjusting the field of view control variables of the camera, and at least two remote control devices for sending commands to the control means thereby adjusting the field of view. In addition the field of view control variables of the camera include a position of the camera field of view with respect to a known reference defined by the control means and the control means includes a movable means for movement of the camera in at least one plane. The field of view controls of the camera includes the perspective of the camera, and the control means can change the perspective in response to a first command of one remote control device. The control means including memory means for remembering each field of view command sent by each remote control device, the field of view command including identity information indicative of respective remote control device which send the command, and the control means remembers the identity information to enable the field of view to be moved to one of the fields of view remembered.

In another aspect of the invention the system includes an automatic tracking system means for automatically tracking each remote control device, each remote control means including tracking means trackable by the tracking system means, the control means including memory means for remembering each command received and information indicative of which remote control unit is sending the command.

The invention also includes a method of controlling the field of view control variables of a camera in a system including a camera, a means for adjusting the field of view control variables of the camera, and at least two remote control devices for sending commands to the control means for adjusting the field of view comprising the steps of: issuing a field of view command from at least one remote control device; and adjusting the field of view of the camera in response to the command. Also, the step of the method may include overriding a field of view command from the one remote control device by a field of view command from the other remote control device. Additionally, each remote control device that issued a respective command is remembered so that the camera field of view may be changed accordingly.

BRIEF DESCRIPTION OF THE DRAWINGS

The novel features, which are believed to be characteristic of this invention, are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE PREFERRED EMBODIMENTS

General Capability

Figure 1:
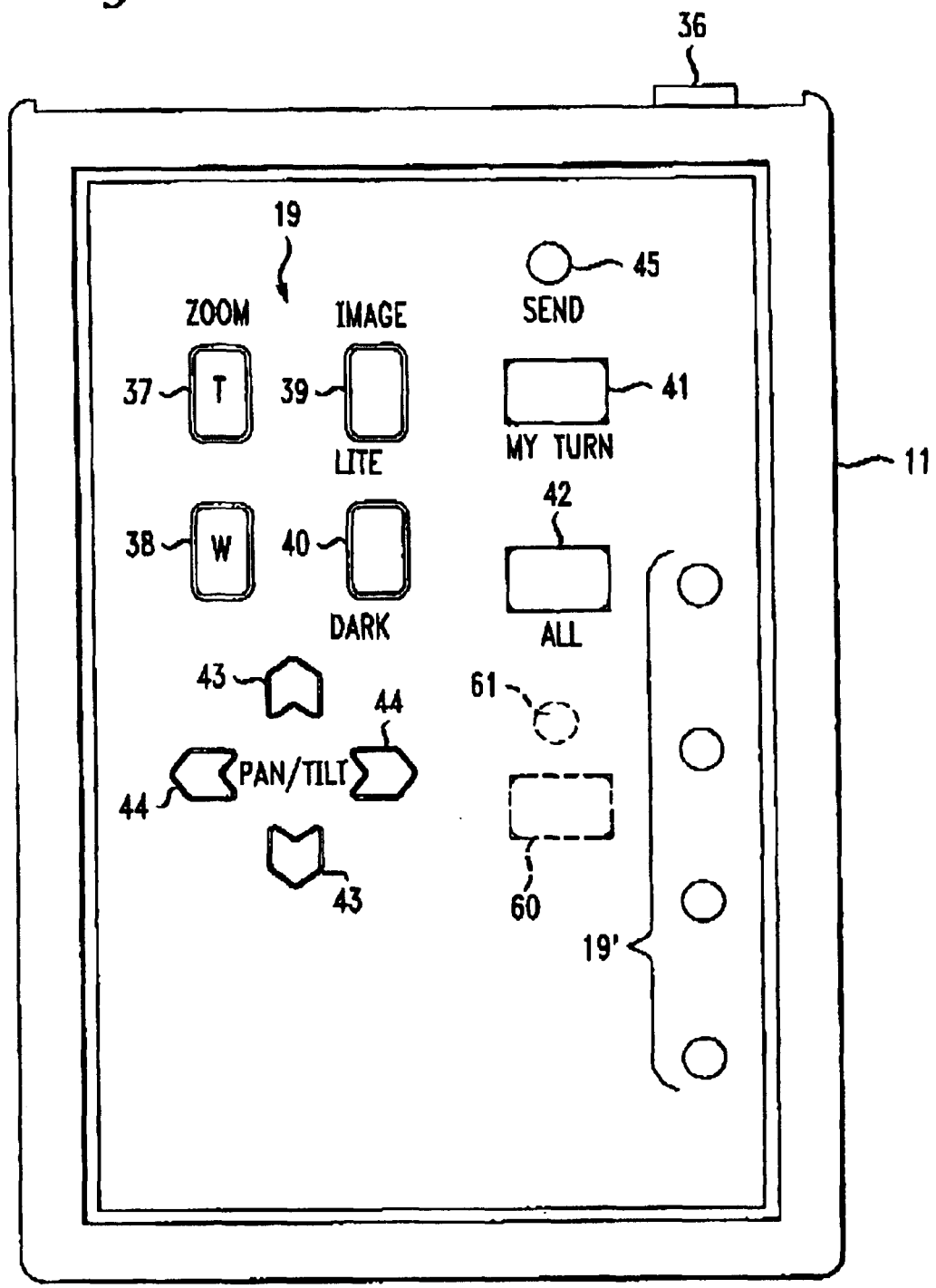
FIG. 1 is a front elevational view of the personal controller or locator used in the present invention.

The present invention employs a remote tracking system as an option for applications which require remote control of the field of view of a moving picture camera, such as video cameras. A brief review of the design and operation of the prior patent and applications, U.S. Pat. No. 5,268,734, and Ser. Nos. 07/736,729; 07/875,078; and 08/078,434, will be helpful in understanding the technology described herein.

The base unit of the tracking system transmits an infrared signal through a rotating set of lenses or signal shapers designed to structure the IR beam in a predetermined process. The base unit includes a microprocessor, which monitors indicating circuitry to calculate the error from exact alignment between the base unit and the remote unit. The remote unit transmits a signal to the base unit containing information regarding the received IR signal, particularly the instantaneous strength of the signal so that exact alignment may be achieved. The base unit contains computational circuitry to calculate the angle of the structured IR beam relative to the reference angle, usually 0 degrees or exact alignment. When the received IR signal strength reaches a maximum or "peak" value, the angle of the IR beam relative to the reference angle will be determined by the base unit circuitry. The base unit, upon which a video camera is mounted or an integral part thereof, will be moved according to the programming of the system. Location PRESETS and OFFSETS from the center alignment of the system is also provided.

The remote unit in the present invention is included in a hand-manipulated personal controller or locator used by the subject, and it includes optional RF and audio circuitry. The remote unit communicates infrared tracking information and other signal data to the base unit as well as commands.

System capability also includes field of view controls. A tracking window is defined in the system as the number of degrees from a reference of 0 degrees that the subject may move before the base unit moves. The size of a window may be programmed by the user of automatically controlled by the system. Window size is one of several variables that can be provided for.

The system may provide for "crossover" control, that is movement back and forth from a zero error position into two "error zones", each defined by the respective zero reference planes. These programs provide for no base unit movement during the automatic tracking mode if "crossover" or the "crossover and return" occurs within a predetermined time period, which, preferably, is 1 second. This program also prevents unnecessary movement of the base unit and provides a smoother picture taking by the camera.

The autotrack algorithms are stored in ROM, and operate to track the remote unit if the angular error between the units is determined to exceed a preset number of degrees.

The base unit will not move to correct the angular error if the subject is within the preset window. If the subject moves out of the preset window, the base unit will move to correct the error. When the error is less than a predetermined amount and the subject is not moving, the window will be reinstated and the base unit will cease movement until the error exceeds the predefined window. A dual window method utilizing a time-based ramp-up method of handling the transition between a stationary situation and the autotracking mode may also be included.

As discussed in the cited patent and applications, the PAN and TILT optics are rotated by a mechanical drive, which also supplies interrupts 1 and 2 to the microprocessor for the START and END of PAN and TILT respectively. In the prior and present system, PAN scans alternate with TILT scans. For each scan, the IR output signal strength is known and the return signal contains information regarding the signal strength at the remote unit. Using the inverse square law (see application Ser. No. 08/078,434) as understood in the art, it is possible to compute the distance between the remote unit and the base unit to a given accuracy depending upon the system specifications.

The previous system also includes control capability for the ZOOM, FOCUS and IRIS functions of a camera, as in the above co-pending applications, and the integration of those functions with the other capabilities of the present system.

Figure 2:
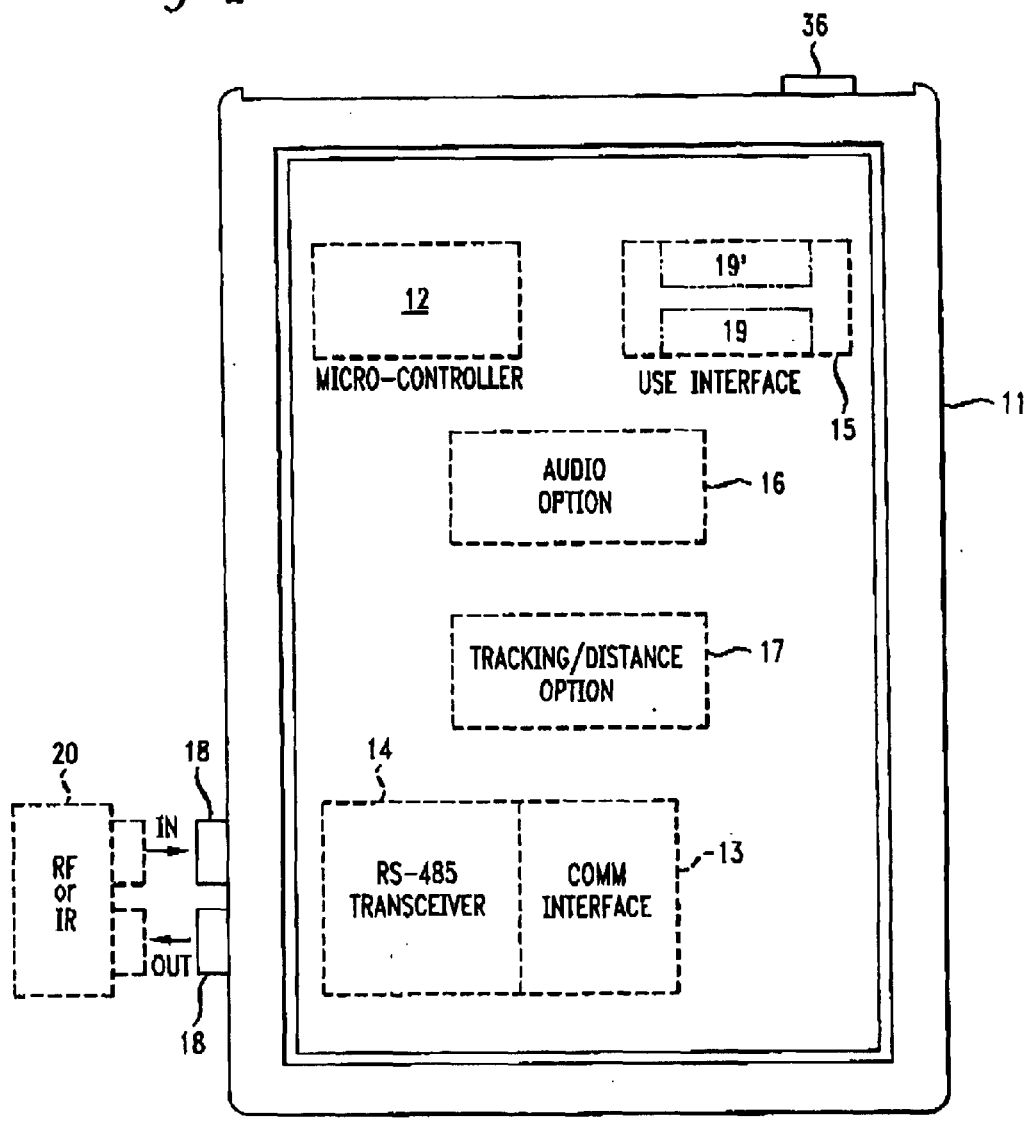
FIG. 2 is a pictorial block diagram of the electronic circuitry of the personal locator of FIG. 1.
Figure 5:
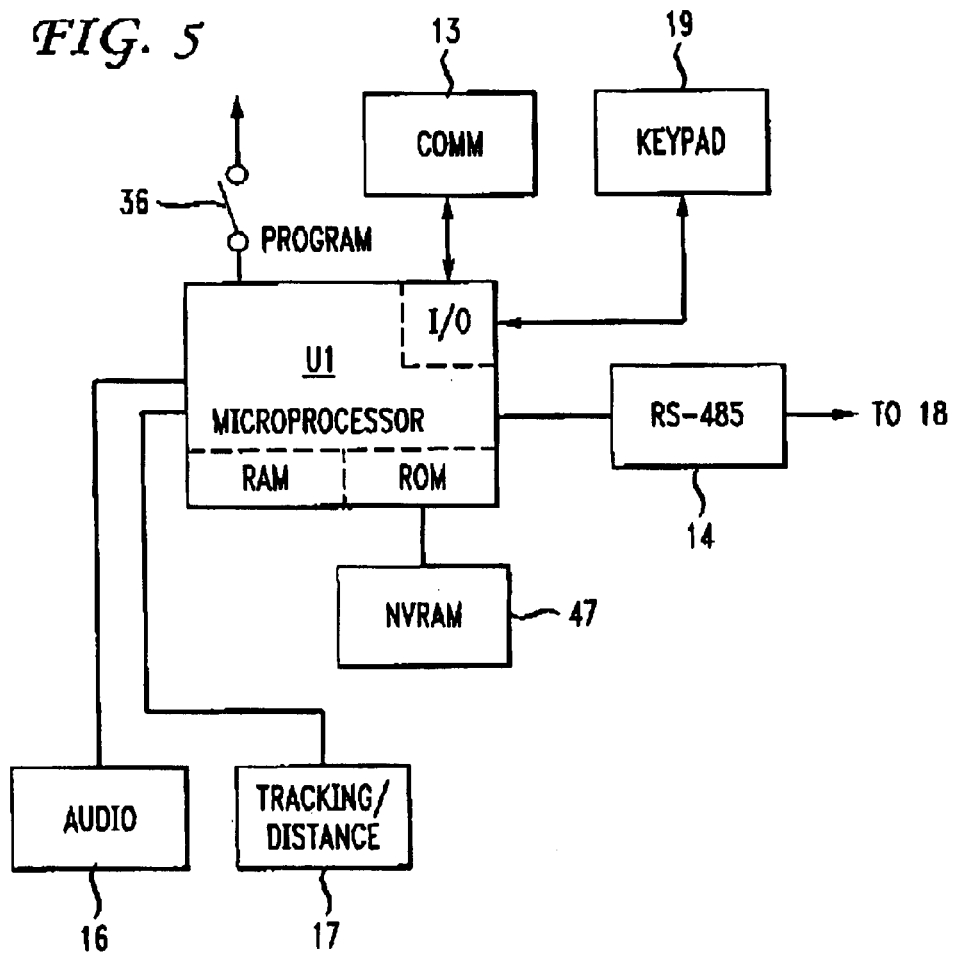
FIG. 5 is a block diagram of the micro-computer used in the locator of FIG. 1.

System Description
Personal Locator:

The system 10 employs a keypad device 11, which is a controller and locator, and referred to as a personal locator (PL) in the present system. The PL device 11 always contains the micro-controller 12, the user interface 15, and the communication circuitry 13. The audio 16 and tracking/distance circuitry 17 is optional in a basic configuration of the PL device 11, but are key components of the present system. The electronic circuitry that is contained in a PL device 11 includes all of the necessary components for basic keypad operation as well as the audio 16 and tracking/distance circuitry 17. The PL devices 11 constructed in this manner are hardwired together via input/output interfaces 18. It should be noted that the wire between keypads 19 could be replaced with either an infrared or RF transceiver 20 making the system 10 wireless (FIGS. 1, 2, 5).

Micro-Controller:

This micro-controller circuitry 12 contains a microprocessor with internal RAM and ROM, external NVRAM, and the appropriate input/output circuitry. The micro-controller (uC) 12 monitors the user interface 15 and communications 13 to coordinate the Personal Locator internal activities and has the ability to enable/disable the local audio 16 and tracking 17 inputs. The uC 12 is specifically responsible for user programming, user displays, real-time user imput, command generation/reception, and program execution.

User Interface:

The interface 15 consists of a button keypad 19, switches 36–44, and indicator lights 19'. The micro-controller 12 uses a button matrix scanning scheme to monitor the button keypad 19. The uC 12 also monitors a program switch 36 for functions which are determined by the current program. The keypad 19 is flexible enough to be configured to support other user interface options such as a LCD display and touch screen input with minor hardware and software changes.

Communications:

The hardware electrical configuration of the communication interface 13 is an RS-485 type transceiver and is combined with the hardware and software of uC 12 to create a multiple access, collision detect transceiver, serial communications bus 27.

Audio:

The audio microphone and associated audio circuitry 16 can provide sound-at-the-source by issuing a command or commands to the keypad 19. The audio circuitry 16 includes the appropriate amplifiers and filters to deliver audio via a differential hardware link. The differential link is designed in such a manner to support a single-ended or non-differential audio link as well.

Tracking/Distance:

The tracking/distance circuitry 17 is similar to that found in the patent and applications cited above, and allows a base unit 21 to locate and track the user with a known or predetermined field of view. The circuitry 17 has provisions for as many tracking sensors as necessary, and the circuitry to enable or disable the tracking signal for each keypad 19 on the bus 27. The tracking signals are carried differentially between keypads 19 and other devices, but are also designed to support single-ended (non-differential) methods. Alternatively, as discussed in the referenced patent and applications, a pair of spaced PAN assemblies allows for distance calculation in accord with the usual trigonometric principles as understood in the art.

System Operation

Figure 3:
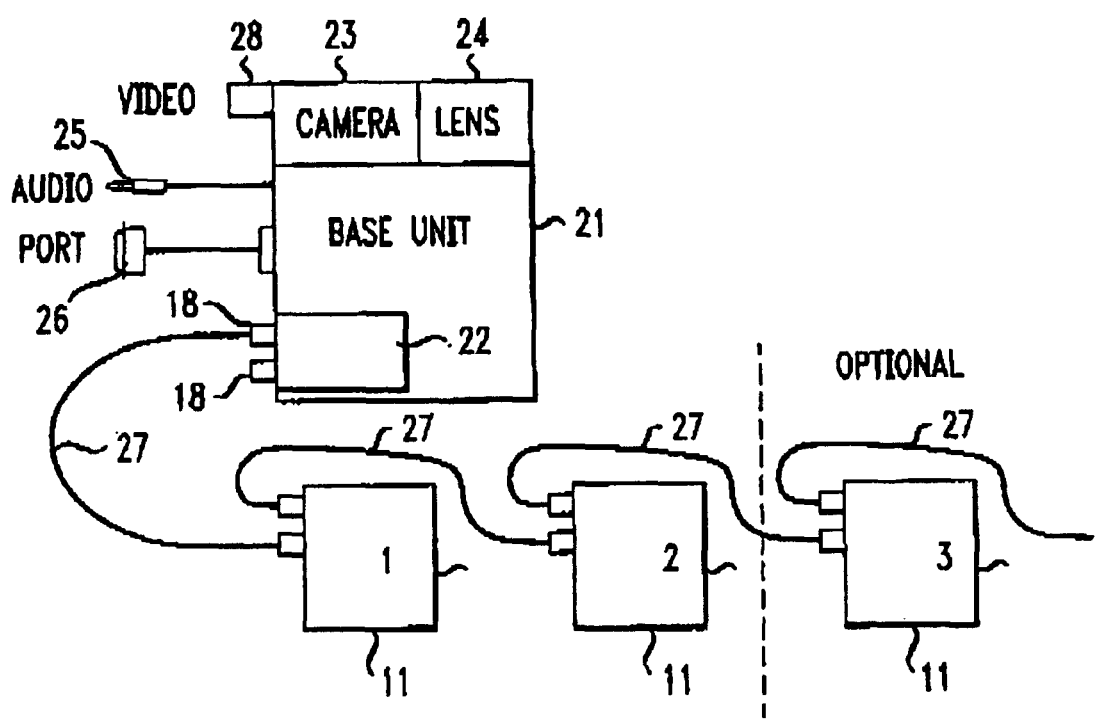
FIG. 3 is a block diagram of one configuration of the multi-user camera system of the present invention.

In the system shown in FIG. 3, the PLs 11 numbered 1, 2 and 3 are configured to incorporate a button keypad 19, interface 15, a microcontroller 12, and a hardwired transceiver 14 as shown in FIG. 2 and operate in accordance with Flowchart 1. The system contains a base unit 21 that has communication circuitry 22 for allowing the PLs 11 to send and receive digital communications from the base unit 21 using an RS-485 serial link 27. Communication circuitry 22 also receives audio and tracking 19 signals from the keypads if these options are used. Base unit 21 is configured to control camera 23 and lens 24 and contains an audio output 25, an RS-232 communication port 26 and configuration switches (not shown).

Figure 18:
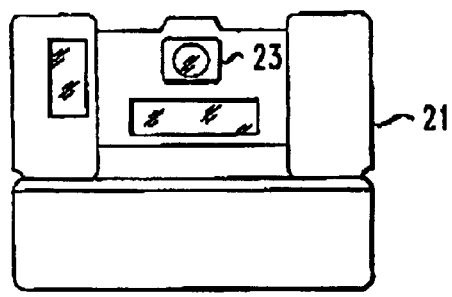
FIG. 18 is a front elevational view of a base unit in accord with the present invention with an integral camera.
Figure 6:
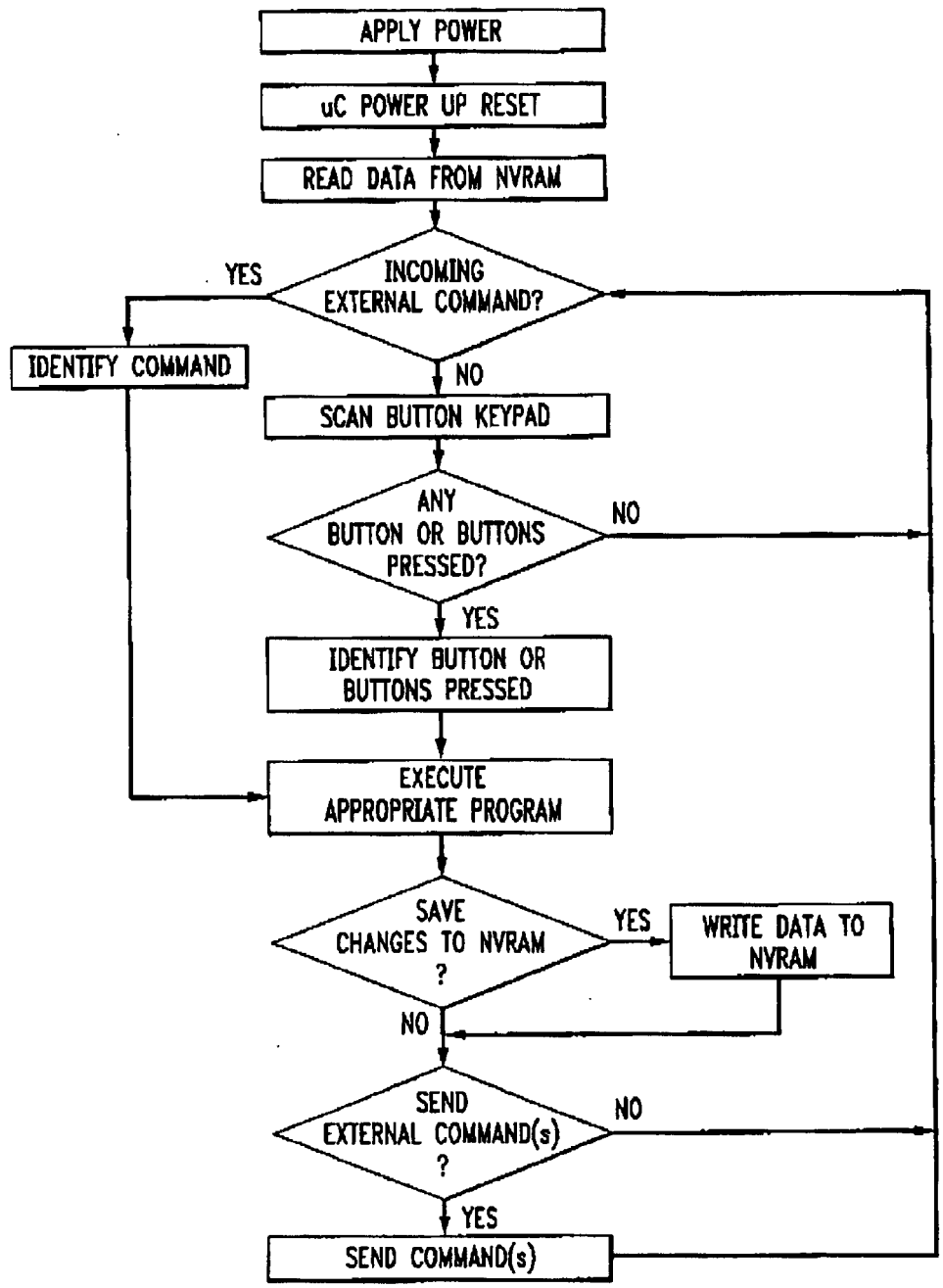
FIGS. 6–14 are flowcharts 1–9 illustrating some of the programming of the present invention.
Figure 7:
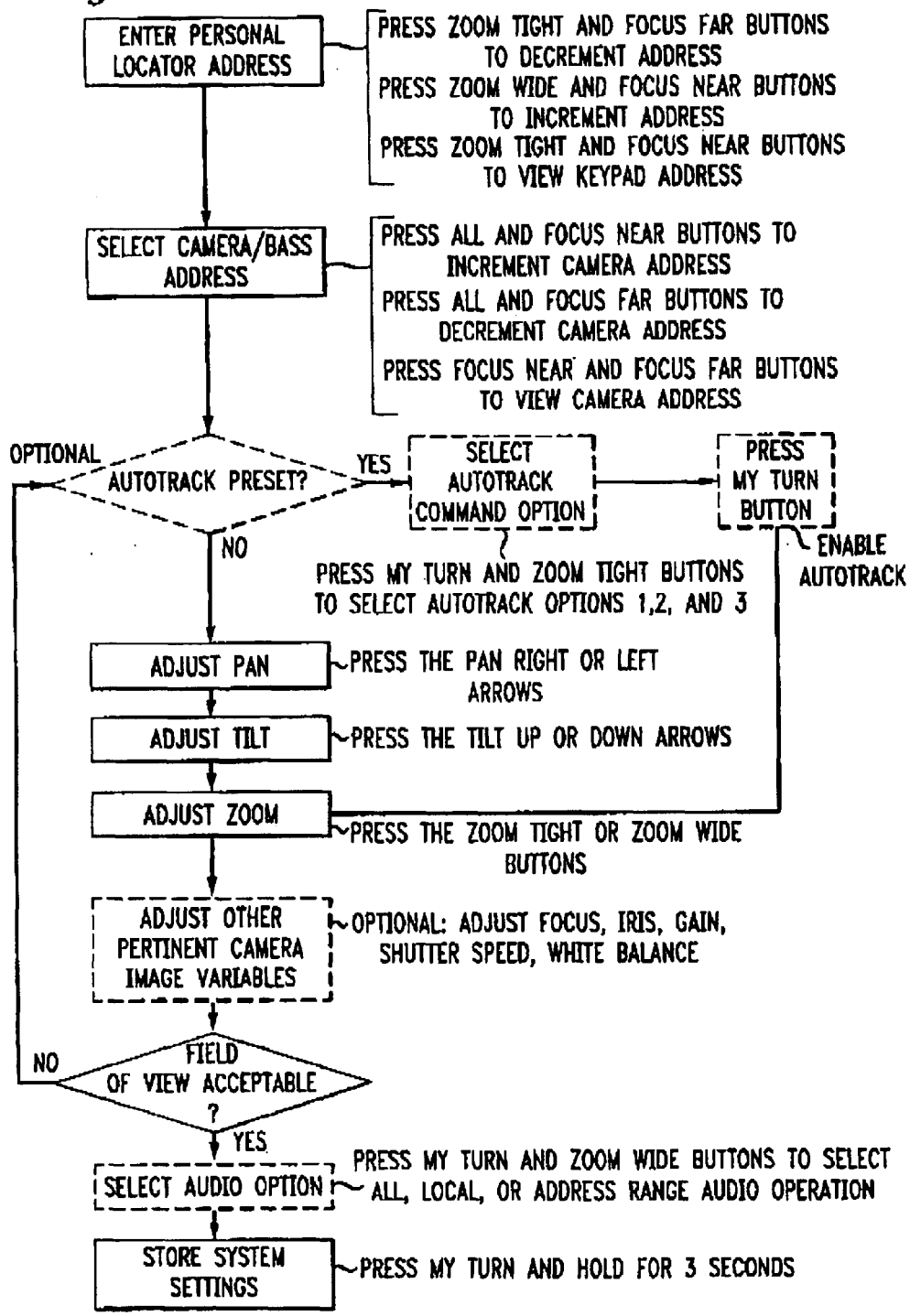
Figure 8:
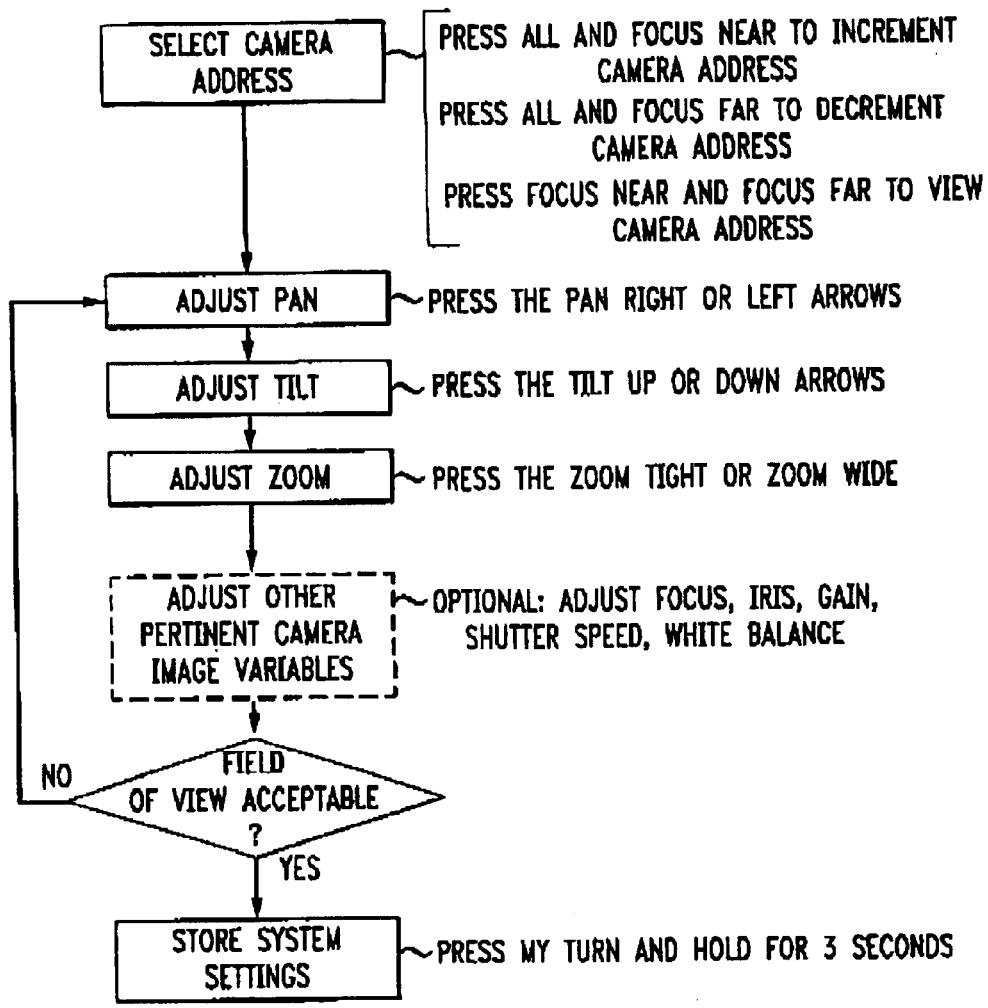
Figure 9:
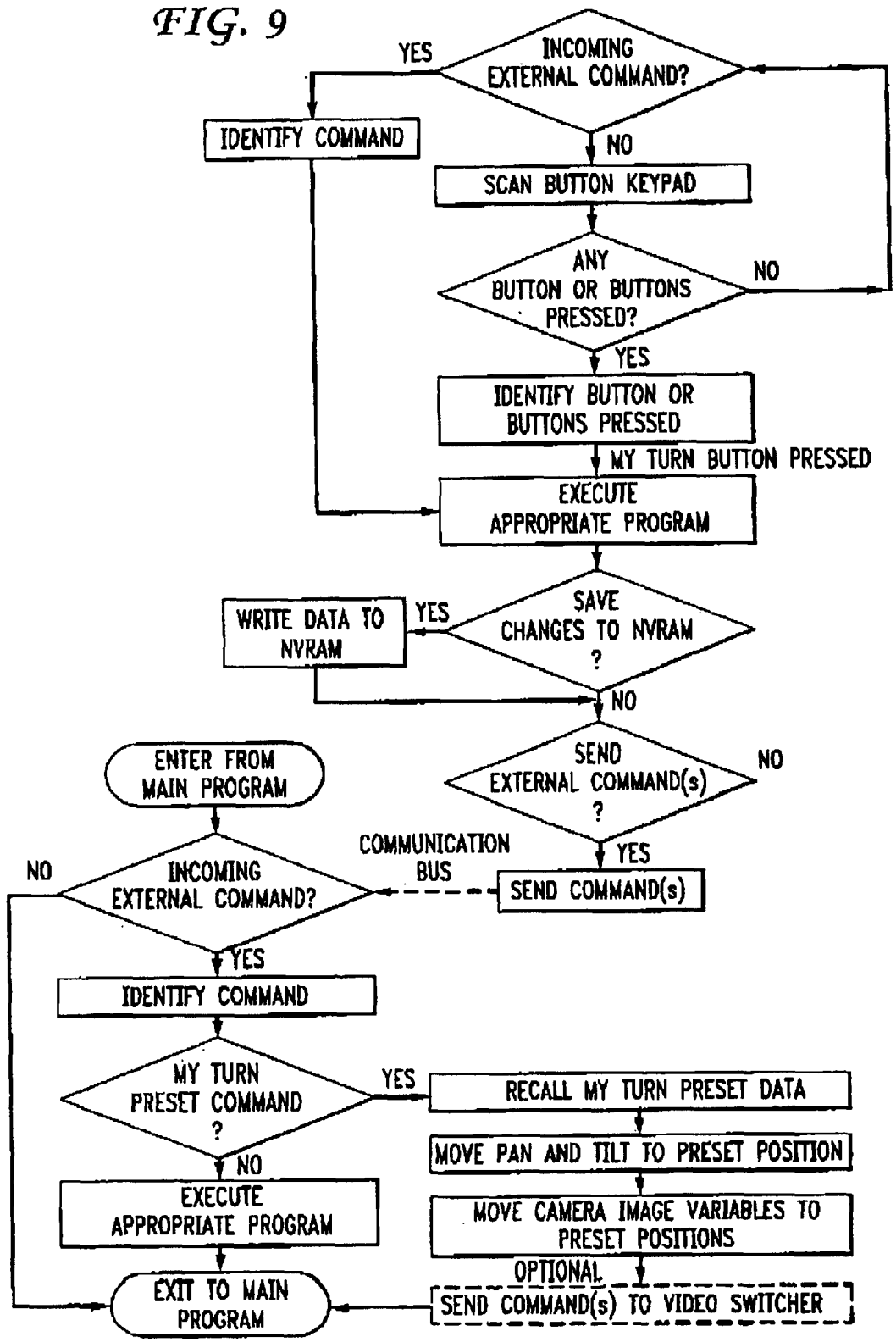
Figure 10:
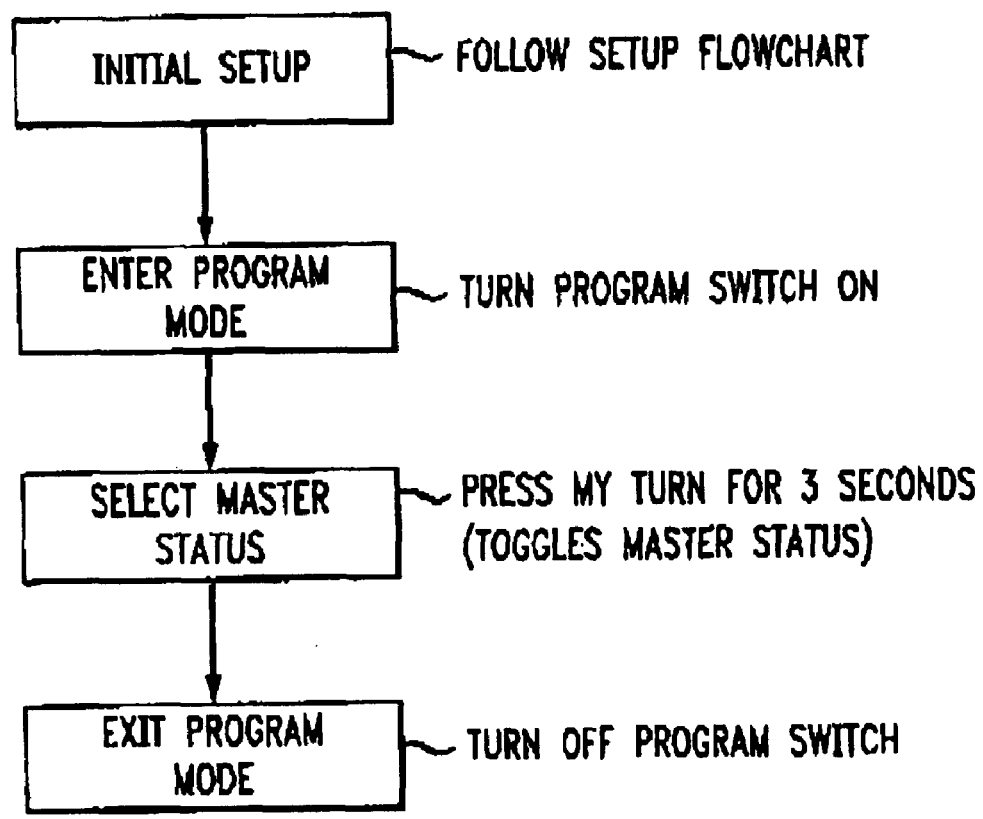
Figure 11:
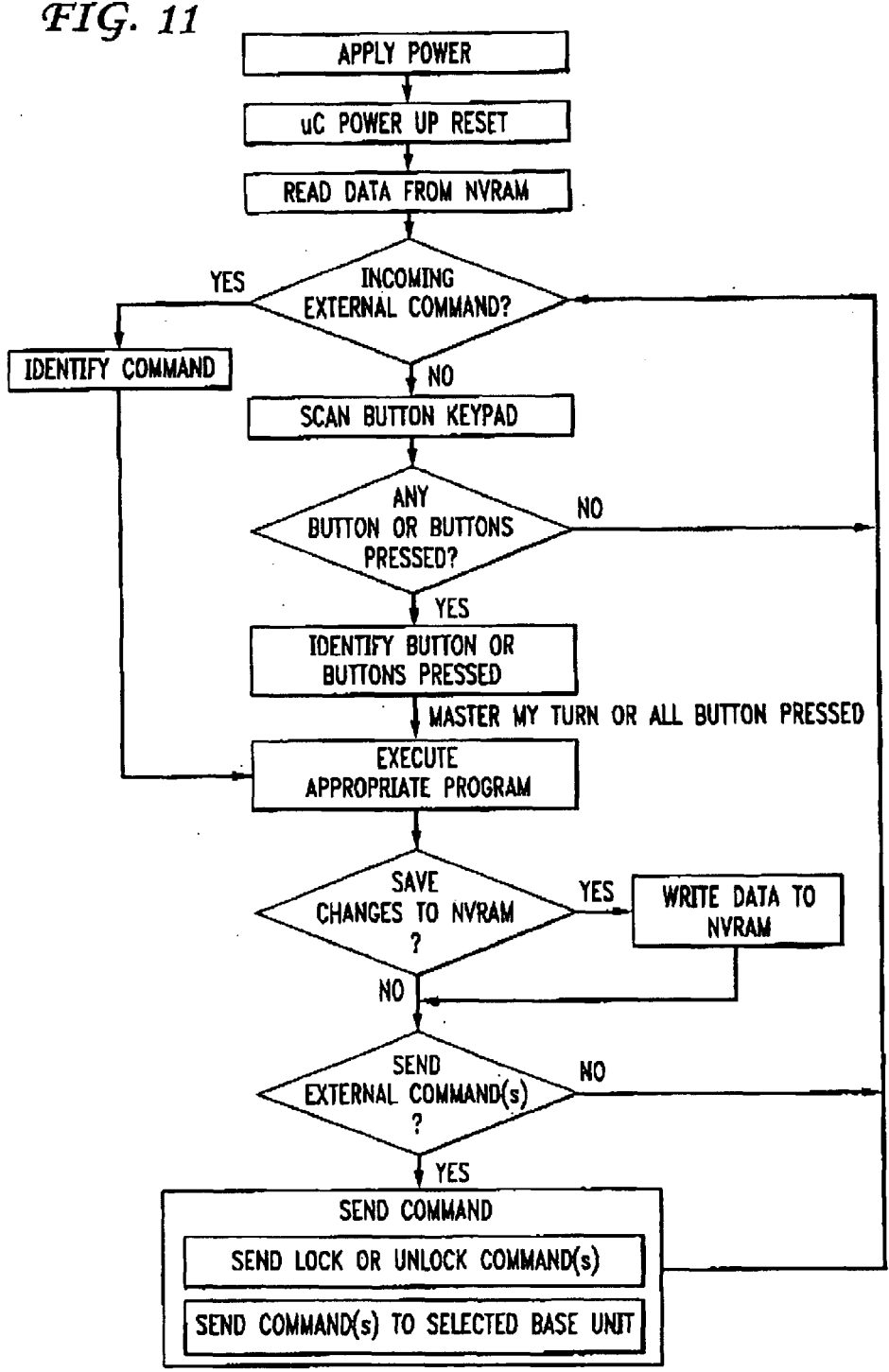
Figure 12:
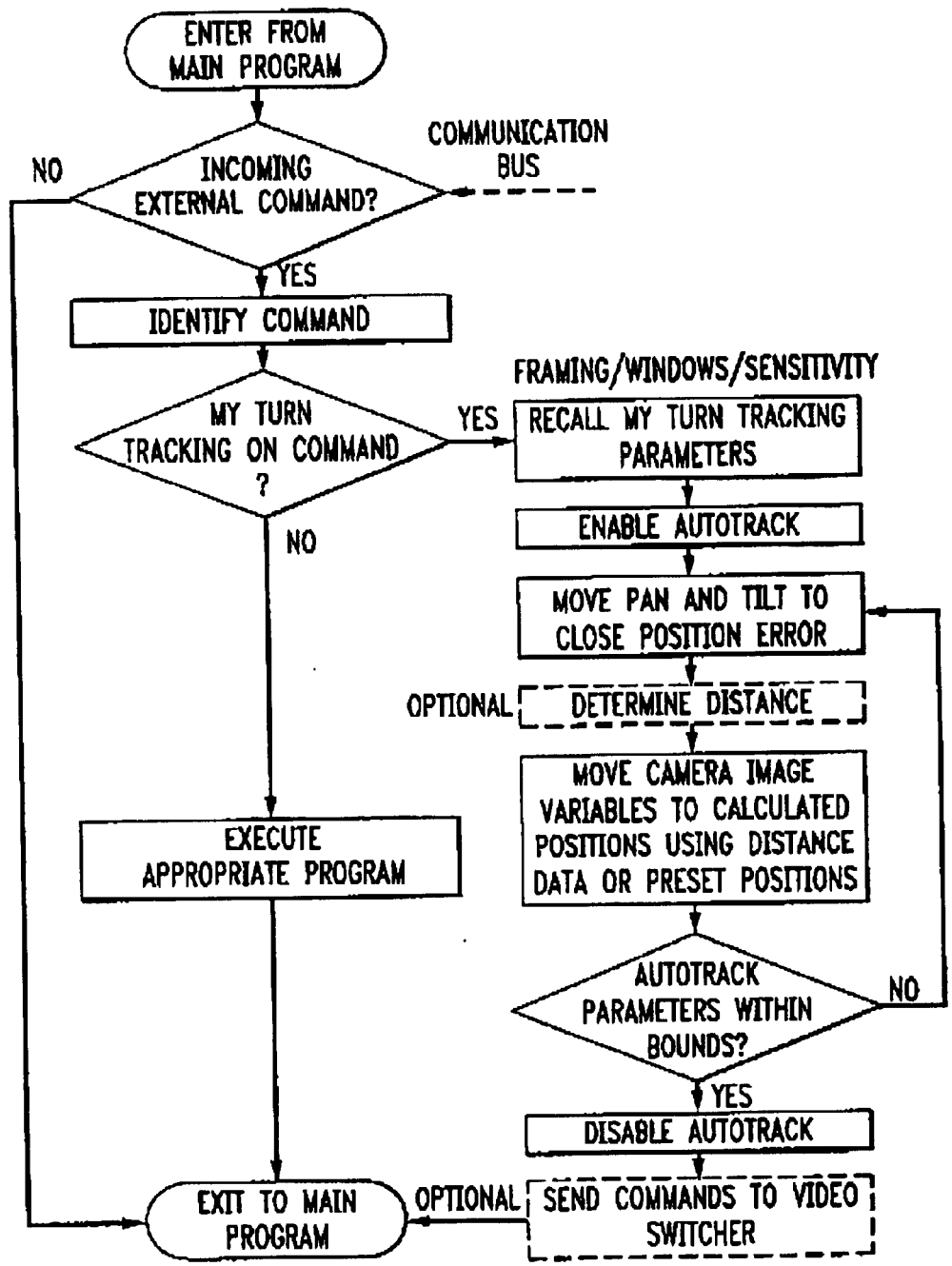
Figure 13:
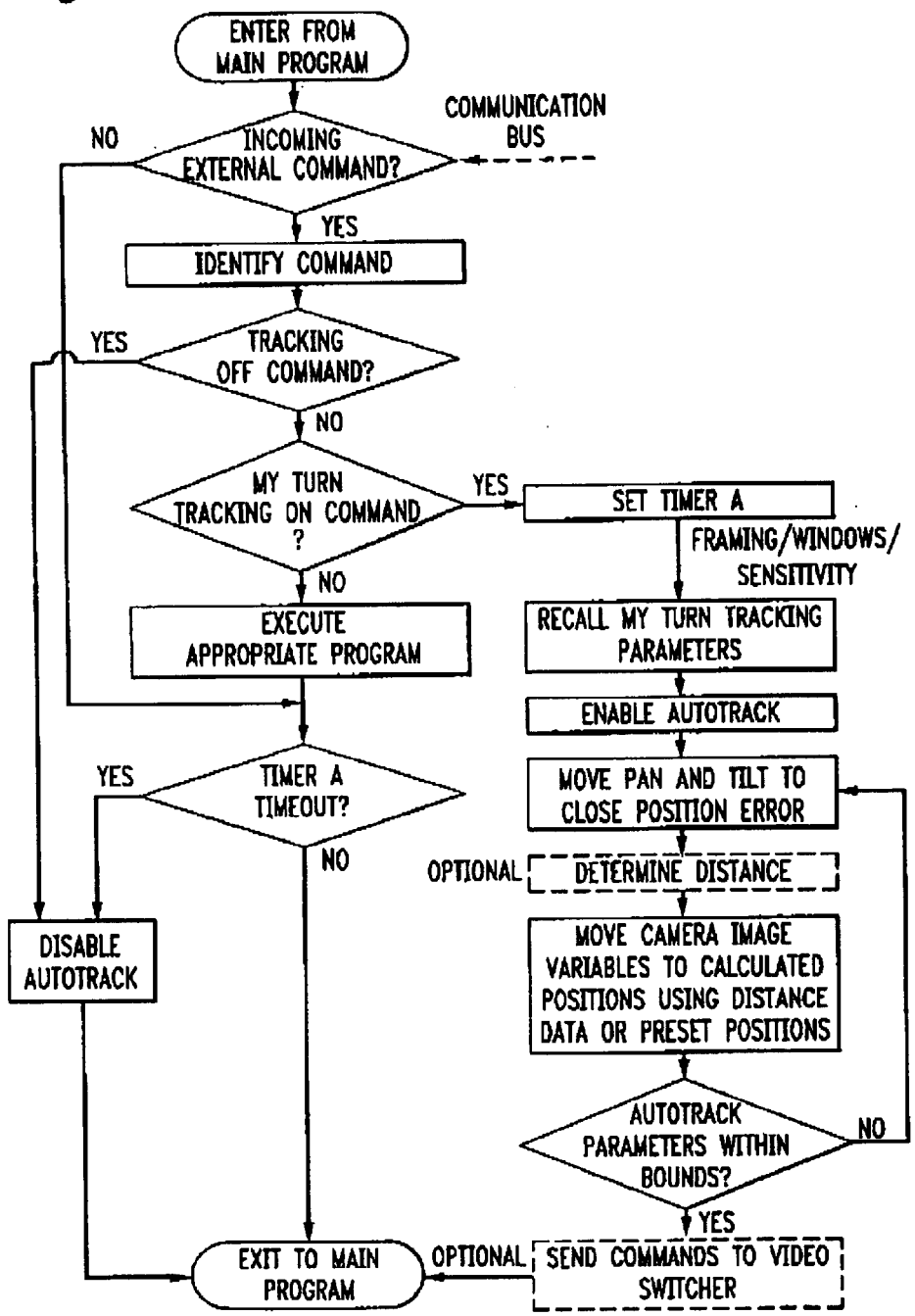
Figure 14:
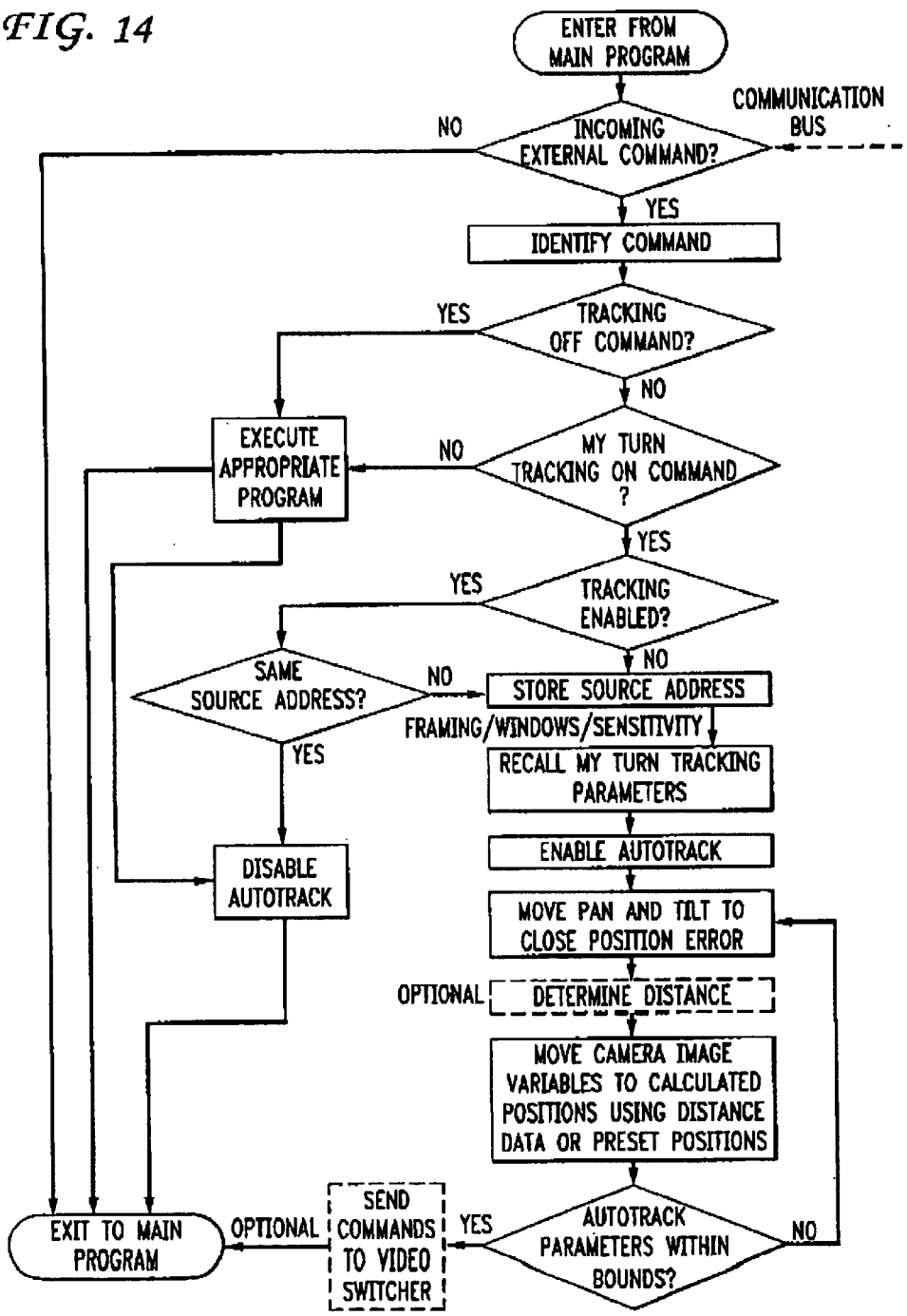

The system 10 setup is accomplished by setting the base unit 21 address on the communication bus 27 using the RS-232 port 26 and a computer or similar device with a compatible port. This base unit 21 address also represents the selected camera 23 address, the camera 23 being mounted on or an integral part of base unit 21 (FIG. 18). Next, each PL 11 is programmed via the keypad 19 to have a unique bus address. Then, the base unit 21 and camera 23 bus address that is to be controlled by the PL 11 is entered from the keypad 19. The selected camera's field of view variables, PAN, TILT, ZOOM, FOCUS and/or IMAGE (LIGHT/DARK) [IRIS, SHUTTER SPEED, GAIN, WHITE BALANCE] would then be adjusted from the PL 11 using the button switches 37–44. The next step is to issue a command to store the variable settings from the PL 11. The procedure for the PL 11 setup is outlined in Flowchart 2. Each PL 11 in the system is setup in the same manner.

When a user wants to display the stored field of view, the PL 11 switch or MY TURN button 41 is pressed on the keypad 19. Base unit 21 receives the command from the PL 11 to position the camera 23 and its lens 24 to produce the desired pre-programmed field of view. When another user wishes to take the floor, the MY TURN button 41 is pressed on the other's PL 11 and the system recalls the pre-programmed field of view for such other user. The keypads 19 also contain an ALL button 42 which causes the system to select another pre-programmed field of view, The ALL VIEW is programmed using the procedure outlined in Flowchart 3 and is accessible to any keypad 19 of PL 11. This basic system operation is detailed in Flowchart 4.

Figure 4:
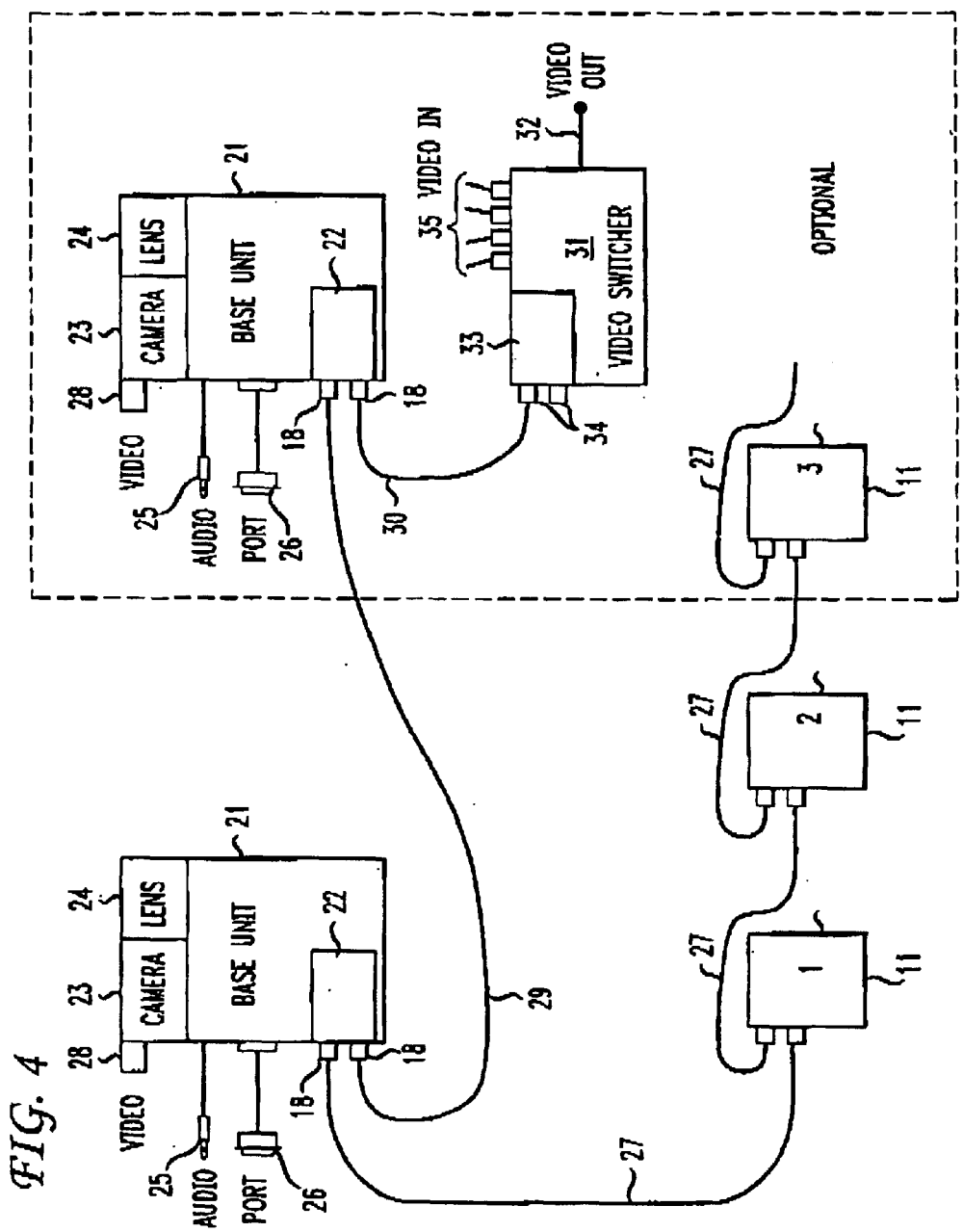
FIG. 4 is a block diagram of another embodiment of the system of the present invention.

FIG. 4 is a diagram of the system 10' with the addition of a video switcher 31 responsive to commands and a second base unit 21 and camera 23. The camera video outputs 28 are connected to the video inputs 35 of the video switcher 31. When a locator or MY TURN button 41 is pressed, the PL keypad 19 issues the appropriate system commands to recall the desired field of view of the selected camera 23. Along with the aforementioned commands, the PLs 11 automatically issue commands to the base unit 21 which in turn issue the commands to video switcher 31 to route the selected camera video to the system video output 28 at the appropriate time (see Flowchart 4). The video switcher 31, such as the one employed in this system is also capable of a picture-in-picture display. This system may also be programmed to automatically display the selected camera video as the main display and another field of view, computer screen, whiteboard, etc., such as the picture-in-picture.

This system has provisions for a "master" PL keypad 19 that is capable of issuing lockout commands to the other keypads 19 on the communication bus 27. Any PL 11 can be configured to be a master by using the program switch 36 and button keypad 19 on the PL 11 (see Flowchart 5). Employing a hierarchical address format, the system uses the keypad 19 addresses to determine priority, meaning that the master keypad 19 is addressed above its slaves. When a master MY TURN button 41 is pressed, the system 10 displays the master's pre-programmed field of view and locks out all of the PL 11 slaves addressed below the master. When the master keypad's MY TURN button 41 is pressed again, all of the PL slaves addressed below the master are released (see Flowchart 6). This arrangement allows the system to support multiple master PLs 11 in a user configurable format. The master PL 11 with the highest address is the overall system master and can "lockout" all other master and slave keypads 19 on the RS-485 bus 27.

The keypad 19 of PL 11 can also issue lock and unlock commands only. These commands are not linked to a predetermined field of view and can be issued by any keypad configured as a master by pressing the MY TURN and ALL buttons 41,42 simultaneously. Pressing these buttons 41, 42 again toggles the lock status of the keypads 19 addressed below the master.

As understood in digital communications, the present invention is in a system command format which provides bits for (1) destination address for the specific base unit 21; (2) source address for the specific PL 11 that is sending a command; (3) a length-of-packet bit; (4) command bits; (5) data bits; and (6) two cyclic redundancy checks as known standards.

Autotrack Options

The PL keypad 19 can be configured to support automatic tracking or autotracking. This feature provides for automatic subject location in the area. To setup an autotracking keypad 19, a base unit 21 is selected and placed in the autotrack mode by pressing the MY TURN button 41 on the keypad. The base unit 21 then tracks the keypad 19 and the user adjusts the desired field of view of the camera 23 using the zoom, focus, iris, framing, and tracking windows commands. The store command is then sent to the appropriate devices from the PL 11 when the MY TURN button 41 is pressed for 3 seconds. When the user issues the MY TURN command, the selected base unit 21 will locate and place the user in the desired field of view whatever location the user is situated in the area.

The PLs 11 can be configured to issue several types of autotrack commands when the MY TURN button 41 is pressed. The specific autotrack command is determined by the keypad 19 setup. When the first type (Type 1) of autotrack command is issued from the PL 11 the system invokes autotrack on the selected base unit 21, locates and places the user in the desired field of view, and then ceases to autotrack (see Flowchart 7). A Type 2 command enables autotrack, places the user in the desired field of view and continues to autotrack the PL 11 movements as long as the MY TURN button 41 is pressed (see Flowchart 8). Type 3 engages autotrack as before, puts the user in the desired field of view, and continues to autotrack until another autotrack command is issued by another PL 11. If the same PL 11 issues the MY TURN command, autotrack is toggled off. If another PL 11 MY TURN button 41 is pressed, the system autotracks the latter PL 11 (see Flowchart 9).

Audio Options

Each PL keypad 19 can contain audio circuitry 16. The micro-controller 12 has an electronic switch to enable/disable the local keypad audio signal creating a multiple of operating options. The first audio option configures the system to enable all keypad audio inputs continuously, giving the system audio output 25 (FIG. 3) the summation of the audio signals of each keypad 19. A second option allows the system to enable the audio from active field of view keypad 19 only, while disabling all other keypads 19. With only one audio input active, true sound-at-the-source is produced. A third option enables audio inputs by address range. In this configuration, selected groups of users could speak and be heard simultaneously. The groups would be determined by the active field of view keypad 19 address and an associated pre-programmed address range.

In both the tracking/distance and audio options the PLs 11 being used will have the appropriate keypad 19 and indicating lights 19'as needed.

Figure 15B:
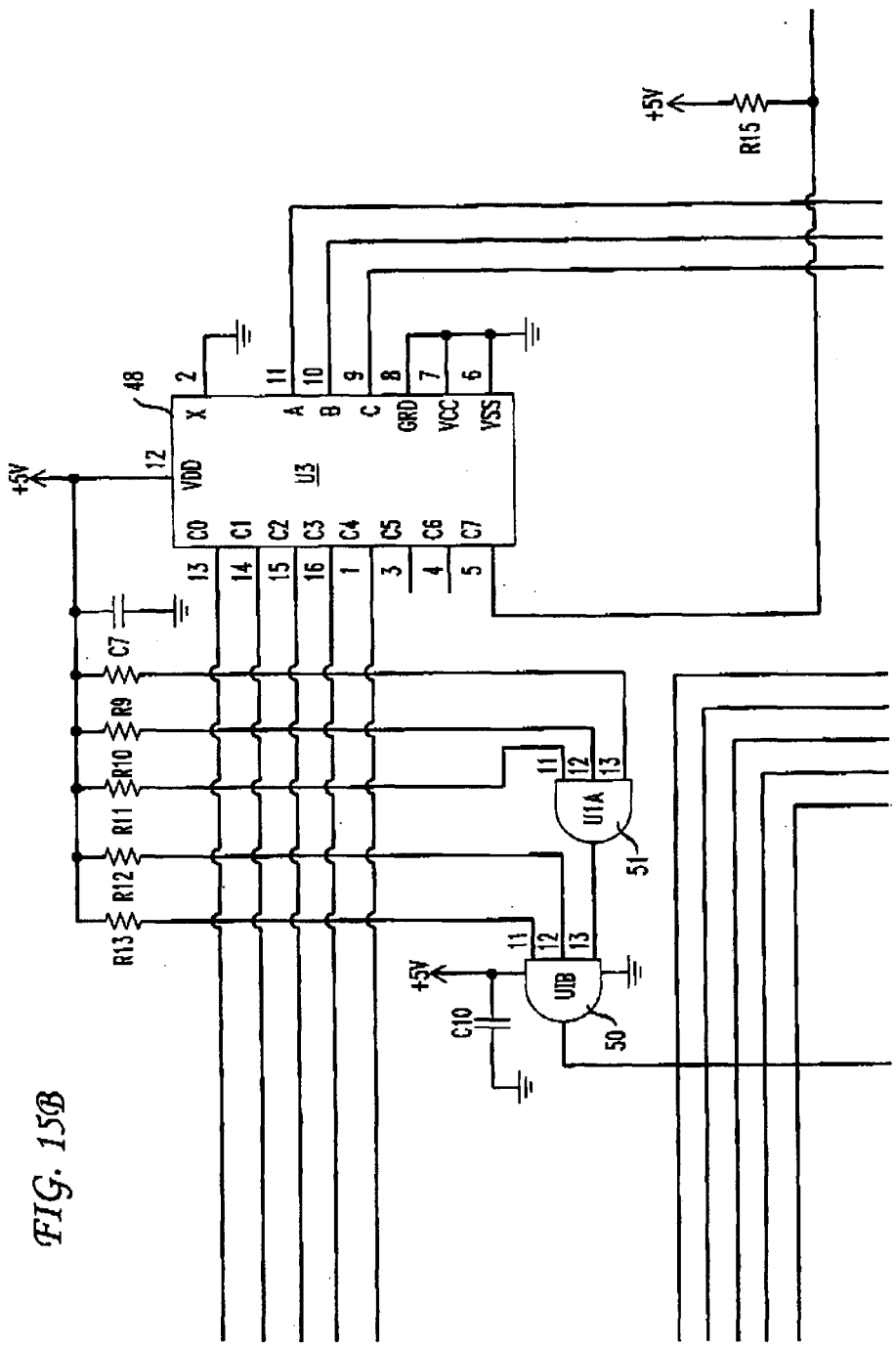
FIGS. 15, 15A and 15D, and 16 and 16A are schematics of the electronic circuitry around which the personal controllers are built.
Figure 15C:
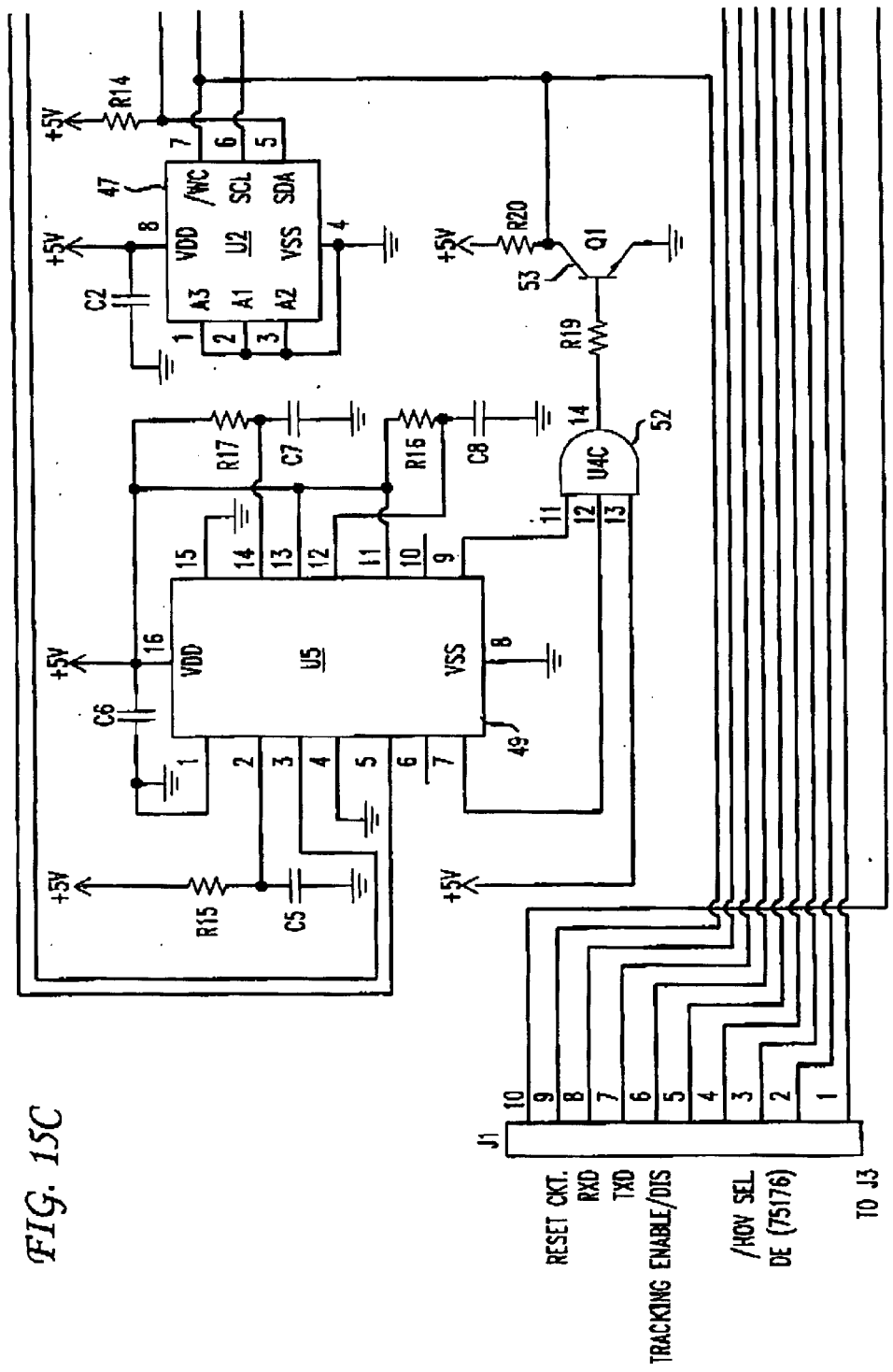
Figure 15E:
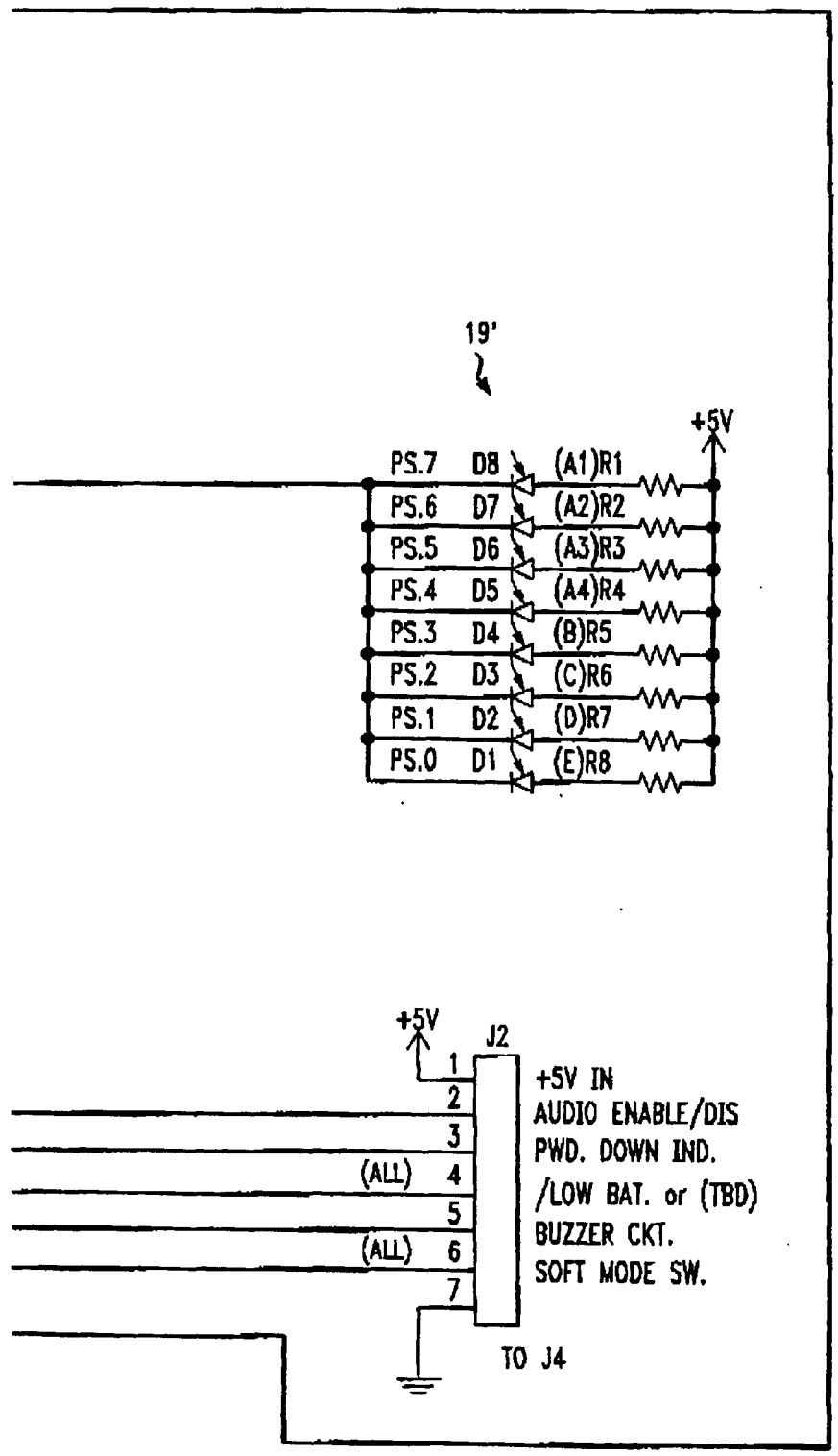
Figures 16, 16A:
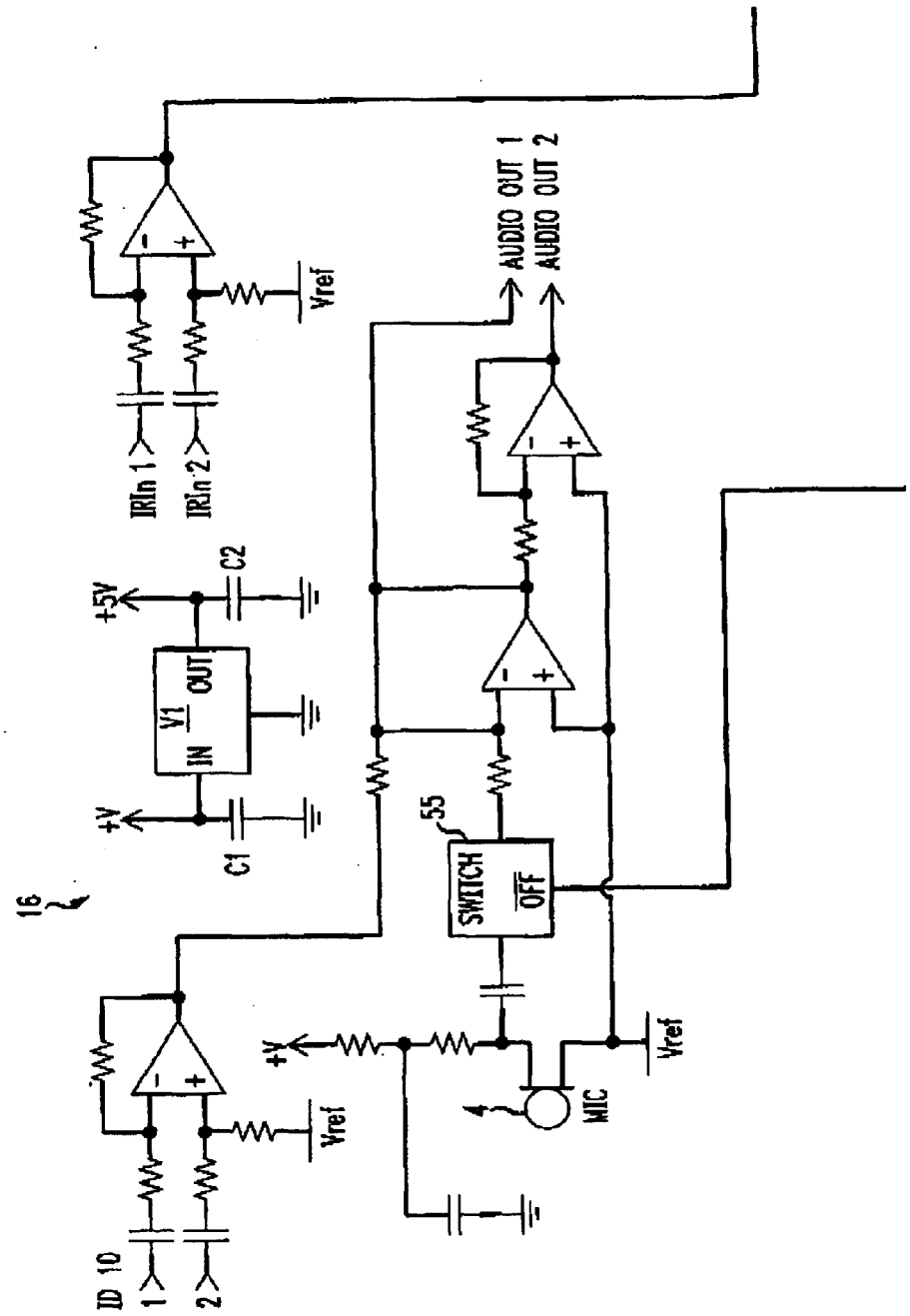
Figure 16B:
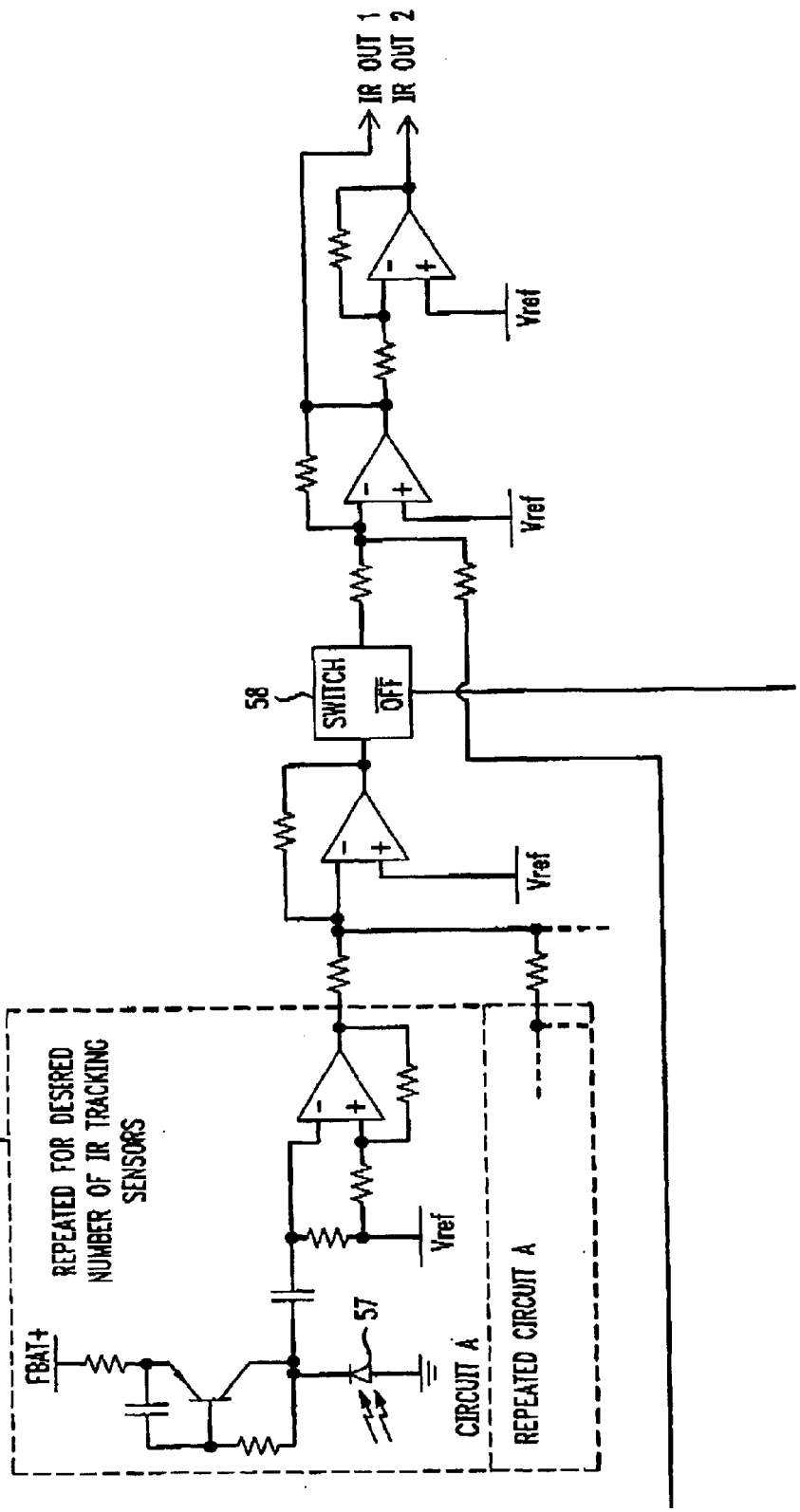
Figure 16C:
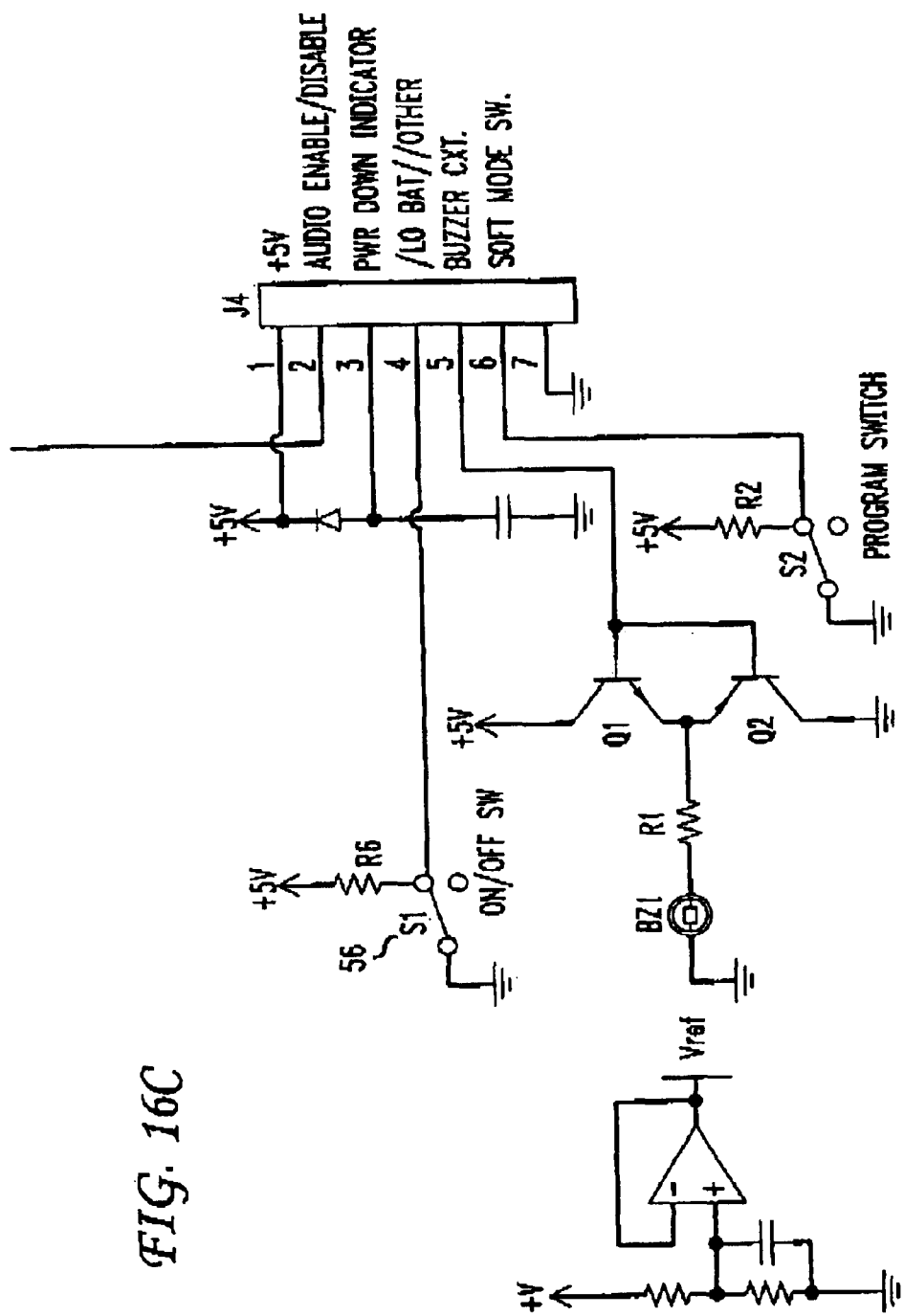
Figure 16D:
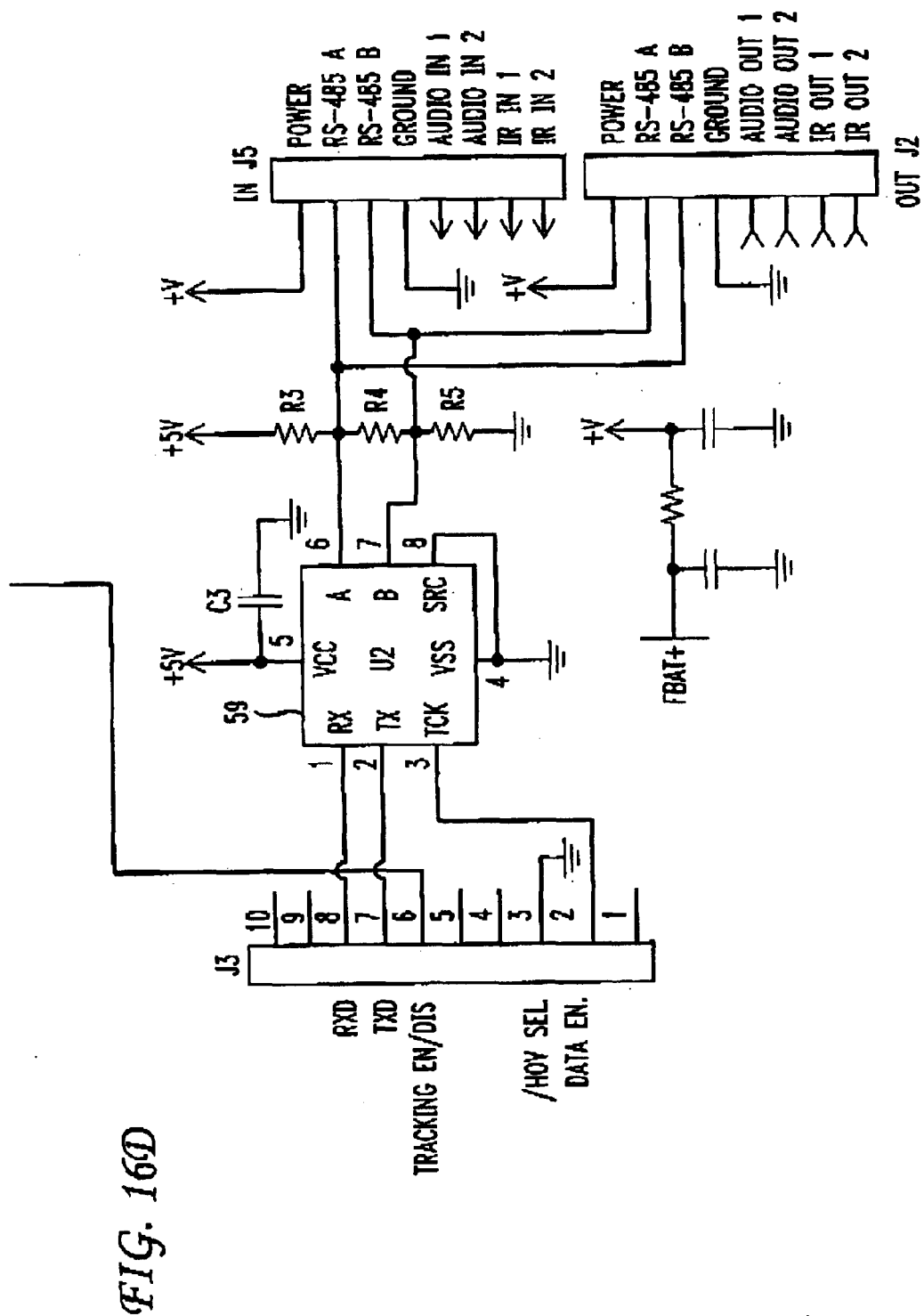

FIGS. 15 and 16 represent schematics of the basic electronic circuitry used in all PL devices. A switch bank provides that the keypad 19 include as many as 23 switches for use in operation. Indicating lights 19' are 8 in number. The number of switches in a keypad 19 and lights in the indication 19' actually used depend upon the specific PL 11 that is being used. The chips 46–52 are all conventional devices known to the art and include microcomputer 12 (U1) NV RAM (U2); switch multiplexer (U3); and power up/reset (U5). Coupling circuit 53 is also standard. In FIG. 16 59 is a standard RS-485 transceiver. Mic 54 output is controlled by switch 55. IR output is controlled via switch 58. Power is controlled via switch 56.

The IR tracking/distance option 17 includes as many detectors 57 and associated circuits as are necessary in the circumstances.

Figure 17:
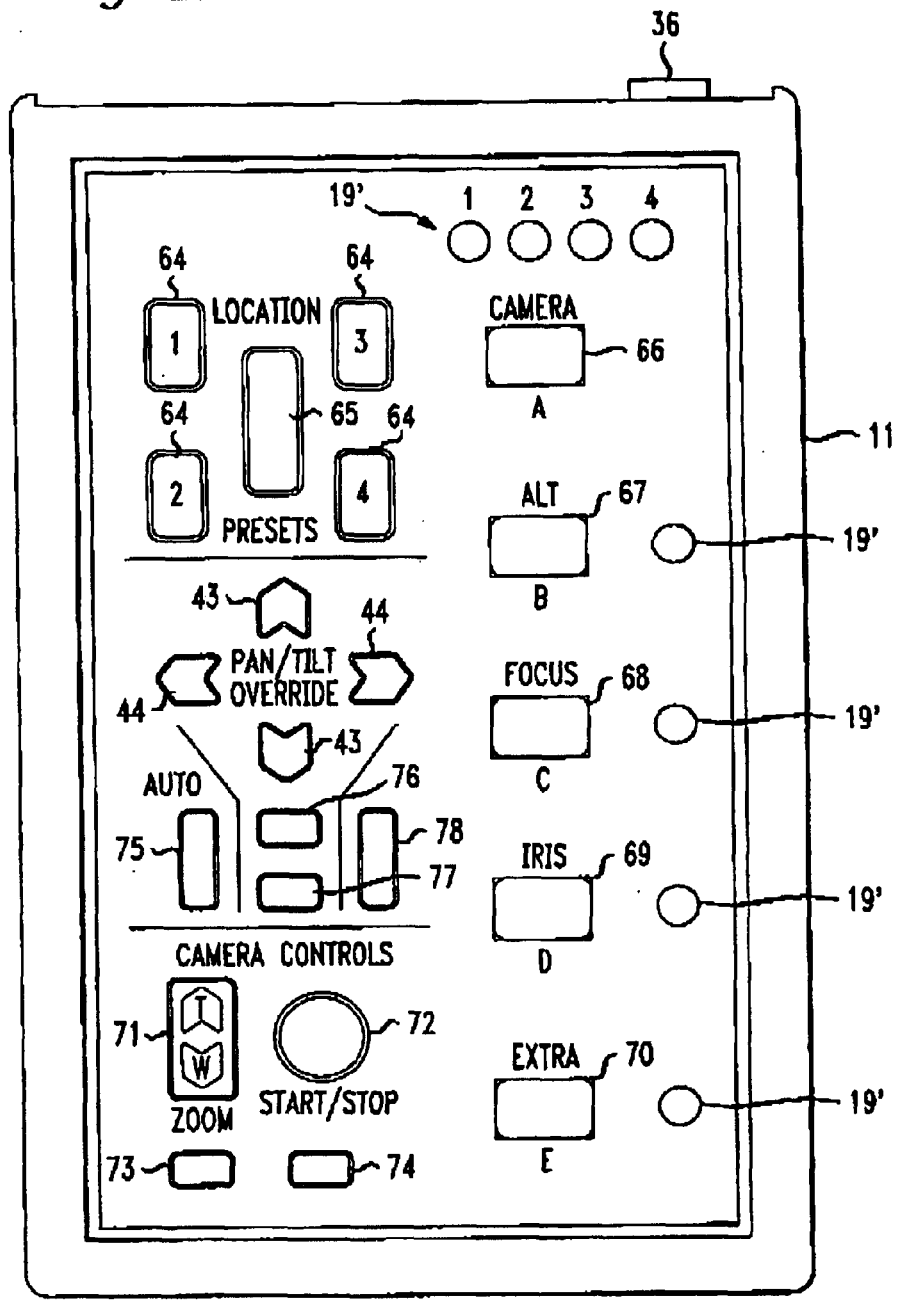
FIG. 17 is a front elevational view of another embodiment of the personal locator in accord with the present invention.

FIG. 17 includes a director's PL 11 that utilizes the full capability of the PL 11 electronics of FIGS. 5, 15 and 16. This device is substantially similar to the device in copending application Ser. No. 08/078,434 referenced above.

Location preset buttons 64 are 4 in number (but not limited to 4) and are used with SET switch 65 to establish four preset locations in the device memory. Switches 66–70 are used in programming the system or 10'. Switch 71 is a conventional ZOOM rocker switch. START/STOP switch and Z1 and Z2 switches 73 and 74 are also used in programming. Autotrack switch 75, FAST and SLOW switches and STEALTH switch are as discussed in the copending application Ser. No. 08/078,434.

It is important to note that the optical functions discussed hereinabove can be dealt with electronically in some CCD cameras. One of the principal objectives of the present invention is multi-user control of the field of view of one or more cameras. The field of view or frame represents the selectable portion of the total image physically available to a camera that is supplied as an output by the camera. That is, not everything within the physical range of a camera lens is necessarily "seen" by the camera at a particular time and camera lens setting and thus cannot be supplied as an output from the camera. The use of "zoom functions" that may require changes in the optical magnification of the camera lens is a case in point. The movement of a ZOOM lens into a "tighter" shot results in significantly less image "seen" by the camera with respect to the total image physically available at other lens positions. Also, the field of view of a camera changes with position as is the case in the present system when the automatic tracking option is in use. The objective is to control all the variables that define the field of view from (1) position in the PAN and TILT planes to (2) camera control, such as ZOOM, FOCUS, IRIS, SHUTTER, GAIN, WHITE BALANCE, and to include the control of these variables of the system.

With reference again to FIG. 1, IMAGE switches 39 and 40 are programmed for use with other keypad 19 switches to provide for control of the iris, focus, shutter speed, gain and white balance variables of the associated camera 23. (As shown clearly in Table I).

TABLE I

Zoom*

Zoom Telephoto
Zoom Wide
Zoom Stop
Zoom Position
Zoom Speed
Focus*

Focus Near
Focus Far
Focus Stop
Focus Position
Focus Speed
Focus Manual
Focus Auto
Iris*

Iris Manual
Iris Auto
Iris Position
Iris Speed
Shutter*

Shutter Speed
Shutter Speed Manual
Shutter Speed Auto
Gain*

Gain −12 db
Gain −6 db
Gain −3 db
Gain 0 db
Gain +3 db
Gain +6 db
Gain +12 db
Gain +18 db
Gain Manual
Gain Auto
White Balance*

White Balance Manual
White Balance Auto
White Balance Indoor
White Balance Fluorescent
White Balance Outdoor
White Balance Position

*Camera Image Variables

In one embodiment of the PL 11, a master override switch 60 is provided along with an associated indicating light 61.

While the invention has been described with respect to certain specific embodiments it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A method of controlling at least one camera to so that said at least one camera captures the image of each of plurality of different objects within a common area capable of being imaged by controlling the camera field of view of said at least one camera responsive to a command from a corresponding one of a plurality of users, each associated with an object, comprising the steps of:

associating with each of the plurality of users at least one field of view for a corresponding one of the plurality of objects within the common area imaged by the camera;

remembering the at least one field of view of each of the plurality of objects imaged by the at least one camera;

receiving a command from one of the plurality of users command to capture the image of a corresponding one of the plurality of objects;

identifying which of the plurality of users issued the command;

automatically controlling the field of view of the at least one camera to the at least one field of view remembered for the object corresponding to the user that issued the command.

2. The method of claim 1 wherein the remembering step further comprising the step of receiving a command from at least one user associated with a corresponding object to remember a field of view for the object associated with the at least one user.

3. The method of claim 2 wherein step of automatically controlling the field of view further comprises the step of moving the at least one camera to remembered field of view position associated with the at least one user from whom the command was received.

4. The method of claim 1 wherein further including the step of remembering the position of the field of view of the at least one camera with respect to a known reference.

5. The method of claim 1 further including the step of remembering the position of the field of view of the at least one camera in a first plane.

6. The method of claim 5 wherein further including the step of remembering the position of the field of view of the at least one camera in each of first and second planes.

7. The method of claim 1 further comprising the steps of:
remembering specific variables of the at least on camera for each field of view remembered; and
automatically recalling the remembered variables when the field of view is recalled.

8. The method of claim 7 including the step of remembering an iris setting of the field of view of the at least one camera.

9. The method of claim 1 including the step of remembering a zoom perspective of the field of view of the at least one camera.

10. The method of claim 9 further including the step of automatically maintaining the remembered zoom perspective remembered when the field of view of the least one camera is moved.

11. The method of claim 1 further including the step of issuing a command to override at least one subsequent command affecting the field of view of the at least one camera.

12. The method of claim 1 further including the steps of:
controlling at least one field of view variable of the at least one camera;
remembering the field of view variables of the at least one camera; and
automatically establishing for the at least camera the remembered field of view variables for the remembered field of view position upon recall of the field of view position.

13. The method of claim 1 further including the step of remembering a specific field of view position for recall upon a command from a user.

14. The method of claim 13 further comprising the step of receiving a command to change the field of view to the remembered field of view.

15. A method of controlling the field of view of each of at least first and second cameras, both cameras movable so each can separately capture the image of at least first and second objects within, a common area within the field of view of each camera, each object associated with a respective one of at least first and second users, each user capable of sending commands via an associated one of at least first and second control device to an automatic control system for controlling the field of view of each of the first and second cameras, comprising the steps of:

associating at least one field of view for each of the at least first and second cameras with one of the at least first and second objects;

remembering by the automatic control system the field of view of each of the at least first and second cameras for each of the at least first and second objects;

receiving at the automatic control system a command from one of the at least first and second control devices;

identifying which of the at least first and second users issued the command;

changing the field of view position of one of the at least first and second cameras to a remembered field of view for the object associated with the one of the first and second control devices that issued the command; and remembering by the automatic control system the one of the first and second control device that issued the command.

16. The method of claim 15 further comprising the step of receiving commands from each of the at least first and second control devices to remember different field of view positions of each of the at least first and second cameras by the automatic control system.

17. The method of claim 16 wherein further comprising the step of remembering a zoom perspective of each camera field of view.

18. The method of claim 15 further comprising the step of selecting a video output signal of one of the at least first and second cameras.

19. The method of claim 15 further comprising the step of remembering a specific field of view position that can be recalled by a command from a separate one of the at least first and second control devices.

20. The method of claim 15 further comprising the step of receiving a command from one of the at least first and second control devices to change the field of view to the remembered field of view position.

21. The method of claim 15 further including the steps of selectively enabling the transmission of an audio signal associated with one of the at least two control devices.

22. The method of claim 19 further including the step of automatically selecting the audio signal from the one control device.

23. The method of claim 19 further including the step of automatically disabling audio signals associated with the at least one control device nor selected.

24. The method of claim 19 further comprising the step of automatically selecting audio signals associated with the at least two control devices when one control device is identified.

25. The method of claim 19 further comprising the steps of:

establishing groups of control devices; and selectively enabling audio signals associated with at least one group.

26. The method of claim 25 further comprising the step of automatically selecting the audio signals associated with the group of control devices enabled.

27. The method of claim 15 further including the steps of:

automatically tracking the first object associated with the first control device responsive to a command from that control device that issued the command; and controlling the field of view to automatically track the object.

28. The method of claim 27 further comprising the step of automatically tracking of the first object only for as long as automatic tracking command is being issued by the first control device.

29. The method of claim 27 further comprising the steps of:

receiving a command from the second control device to provide automatic tracking of the second object;

ceasing to automatically track the first object.

30. The method of claim 15 further including the step of selectively providing a video output signal from one of the at first and second cameras.

31. The method of claim 30 wherein further including the step of automatically selecting the video output signal associated with the first camera.

32. The method of claim 15 further comprising the step of remembering a specific field of view for one of the at least first and second cameras that can be recalled by a command from any of the at least first and second control devices.

33. The method of claim 15 wherein further comprising the step of receiving a command by any of the at least first and second control devices to change the field of view of any of the at least first and second cameras to the specific field of view position previously remembered.

34. The method of claim 15 further including the step of receiving a command to override subsequently received commands affecting control of the field of view of any of the at least first and second cameras.

35. The method of claim 34 further including the step of receiving a command to restore a capability to respond to commands from either of the at least first and control devices.

36. The method of claim 15 further including the steps of:

remembering field of view variables for one of the at least first and second objects being tracked; and recalling the remembered variables when the one of the at least first and second objects is being automatically tracked.

37. The method of claim 36 further including the step of remembering variables associated with automatic tracking of one of the at least two control devices.

38. The method of claim 37 further including the step of remembering the location in the field of view of the one object to be maintained during automatic tracking.

39. A system comprising:

at least first and second cameras, each capturing at least first and second objects within a common area, at least first and second control devices, each controlled by first and second users, respectively, each user associated with a respective one of the at least first and second objects;

automatic control means for adjusting variables of the field of view associated with the first and second objects within the field of view of each of the first and second said cameras, including first circuit means for identifying a first one of the at least first and second control device from which the automatic control means has received a command;

first memory means for identifying said command received from said first one of the at least first and second devices, said command including identity information indicative of the control device which sent said command, said memory means remembering said identity information of the control device after said command has been received therefrom to enable said field of view to be associated with the one of the remembered field of views; and second circuit means for identifying a second of the at least first and second control device from which the automatic control means has received a command; and second memory means for identifying said command received from the second one of the at least first and second and second control devices, said command including identity information indicative of the control device which sent said command, said second memory means remembering said identity information of the control device after said command has been received therefrom to enable said field of view to be associated with the one of the remembered field of views.

40. The system as defined in claim 39 wherein said second circuit means includes memory means for remembering specific variables associated with each field of view.

* * * * *